(12) United States Patent
Suzuki

(10) Patent No.: US 11,271,494 B2
(45) Date of Patent: Mar. 8, 2022

(54) POWER CONVERTER AND ELECTRIC POWER STEERING SYSTEM USING THE SAME

(71) Applicant: DENSO CORPORATION, Kariya (JP)

(72) Inventor: Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 48 days.

(21) Appl. No.: 16/662,413

(22) Filed: Oct. 24, 2019

(65) Prior Publication Data
US 2020/0059167 A1 Feb. 20, 2020

Related U.S. Application Data

(63) Continuation of application No. PCT/JP2018/015927, filed on Apr. 18, 2018.

(30) Foreign Application Priority Data

Apr. 27, 2017 (JP) .............................. JP2017-088272

(51) Int. Cl.
| | | |
|---|---|---|
| H02P 27/08 | (2006.01) | |
| H02M 7/5387 | (2007.01) | |
| H02M 1/08 | (2006.01) | |
| B62D 5/04 | (2006.01) | |

(52) U.S. Cl.
CPC ...... *H02M 7/53871* (2013.01); *B62D 5/0412* (2013.01); *B62D 5/0463* (2013.01); *H02M 1/08* (2013.01); *H02P 27/08* (2013.01)

(58) Field of Classification Search
USPC ....................................................... 318/400.27
See application file for complete search history.

(56) References Cited

U.S. PATENT DOCUMENTS

| | | | |
|---|---|---|---|
| 7,265,601 B2 * | 9/2007 | Ahmad | ................... H02M 1/08 |
| | | | 323/313 |
| 8,217,704 B2 | 7/2012 | Kohama et al. | |
| 2014/0240026 A1 * | 8/2014 | Hwang | ............... H01L 29/7787 |
| | | | 327/382 |
| 2015/0035464 A1 * | 2/2015 | Maekawa | ................. H02P 6/24 |
| | | | 318/400.21 |

FOREIGN PATENT DOCUMENTS

| | | | | |
|---|---|---|---|---|
| JP | 2011-250603 A | | 8/2011 | |
| JP | 2011250603 A | * | 12/2011 | |
| JP | 5747445 B2 | | 7/2015 | |
| JP | 2017047778 A | * | 3/2017 | |
| JP | 2017047778 A | | 9/2017 | |
| WO | WO-2016031715 A1 | * | 3/2016 | ................ H02P 6/08 |

* cited by examiner

*Primary Examiner* — Jorge L Carrasquillo
(74) *Attorney, Agent, or Firm* — Maschoff Brennan

(57) ABSTRACT

A power converter includes: an inverter that includes an upper arm element and a lower arm element, and converts electric power supplied from a DC power source via a power wiring so as to supply the electric power to a load; a driver that receives electric power supplied from the DC power source via a control wiring, and applies gate voltage to the upper arm element and the lower arm element; and a controller that includes a drive controller controlling operation of the upper arm element and the lower arm element in accordance with a current command value.

8 Claims, 14 Drawing Sheets

POWER CONVERTER AND ELECTRIC POWER STEERING SYSTEM USING THE SAME

CROSS-REFERENCE TO RELATED APPLICATION

The present application is a continuation application of International Patent Application No. PCT/JP2018/015927 filed on Apr. 18, 2018, which designated the U.S. and claims the benefit of priority from Japanese Patent Application No. 2017-088272 filed on Apr. 27, 2017. The entire disclosures of all of the above applications are incorporated herein by reference.

TECHNICAL FIELD

The present disclosure relates to a power converter and an electric power steering system using the power converter.

BACKGROUND

There is known a power converter including a switching element such as a MOSFET. The power converter includes a drive circuit that is used to drive the switching element. A gate drive circuit that suppresses decrease in gate voltage has been known.

SUMMARY

The present disclosure describes a power converter including: an inverter that includes an upper arm element and a lower arm element, and converts electric power supplied from a direct current (DC) power source via a power wiring so as to supply the electric power to a load; a driver that receives electric power supplied from the DC power source via a control wiring, and applies gate voltage to the upper arm element and the lower arm element; and a controller that includes a drive controller controlling operation of the upper arm element and the lower arm element in accordance with a current command value.

BRIEF DESCRIPTION OF DRAWINGS

Objects, features, and advantages of the present disclosure will become more apparent from the following detailed description with reference to the accompanying drawings. In the drawings.

DETAILED DESCRIPTION

Figure 1:
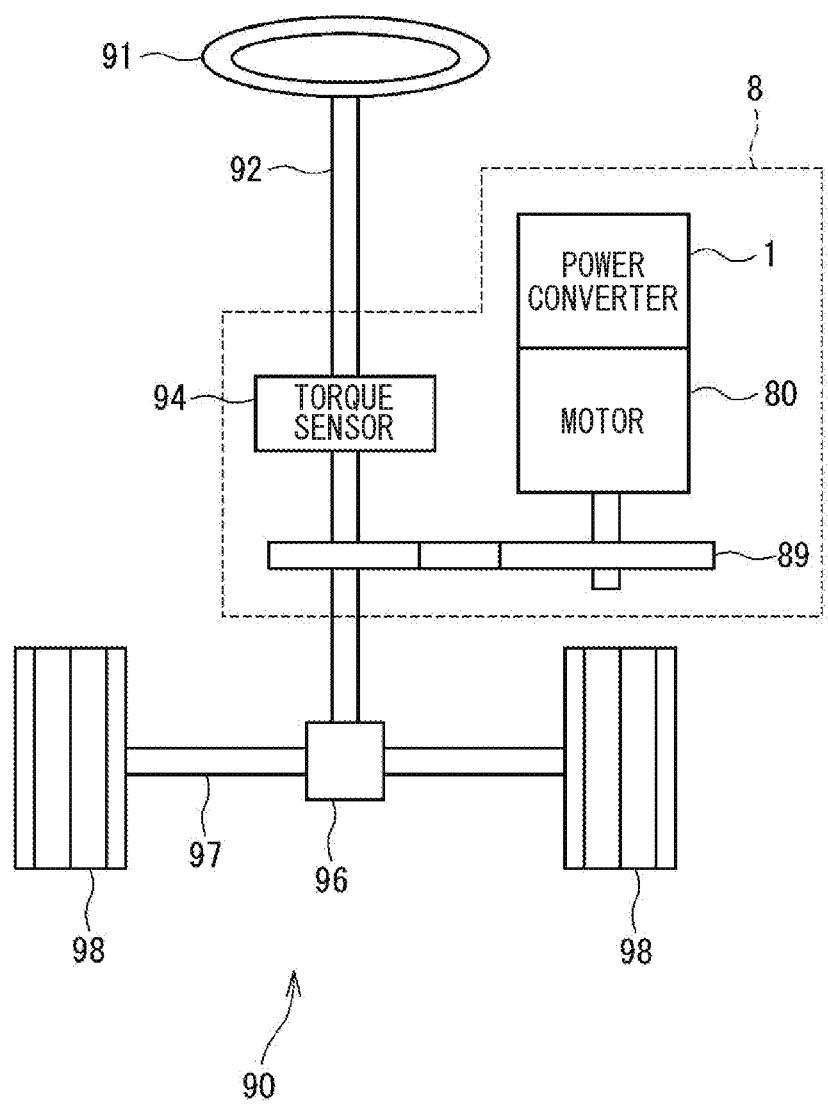
FIG. 1 is a schematic structural view illustrating a steering system according to a first embodiment.

When input voltage applied to a power converter decreases to cause decrease in gate voltage applied to a switching element, the power converter may break down. When a circuit for suppressing decrease in gate voltage is provided, the number of components may increase.

The present disclosure describes a power converter capable of protecting a circuit without increasing the number of components, and an electric power steering system using the power converter.

The power converter of the present disclosure includes an inverter, a driver, and a controller. An inverter includes an upper arm element connected to a high potential side and a lower arm element connected to a low potential side, and converts electric power supplied from a direct current (DC) power source via a power wiring so as to supply the electric power to a load. The driver receives electric power supplied from the DC power source via a control wiring, and applies gate voltage to the upper arm element and the lower arm element. The controller includes a drive controller controlling operation of the upper arm element and the lower arm element in accordance with a current command value.

The DC power source supplies electric power to a device other than the inverter. The controller limits electric current flowing into the load in accordance with the gate voltage, or input voltage that is voltage of the power wiring or voltage of the control wiring and the gate voltage. For example, when a MOSFET (metal-oxide-semiconductor field-effect transistor) is used for each of the upper arm element and the lower arm element, decrease in the gate voltage increases on-resistance to increase heat generation. Thus, in the present disclosure, electric current is limited in accordance with the gate voltage, or the gate voltage and the input voltage to suppress heat generation of the upper arm element and the lower arm element when the gate voltage decreases. It may be possible to maintain supply of electric power to the load while protecting the inverter, without providing a separate circuit to suppress decrease in gate voltage.

A power converter and an electric power steering system using the power converter will be described based on the drawings. In embodiments below, a substantially identical component will be designated by the same reference numeral to eliminate duplicated description.

First Embodiment

Figure 2:
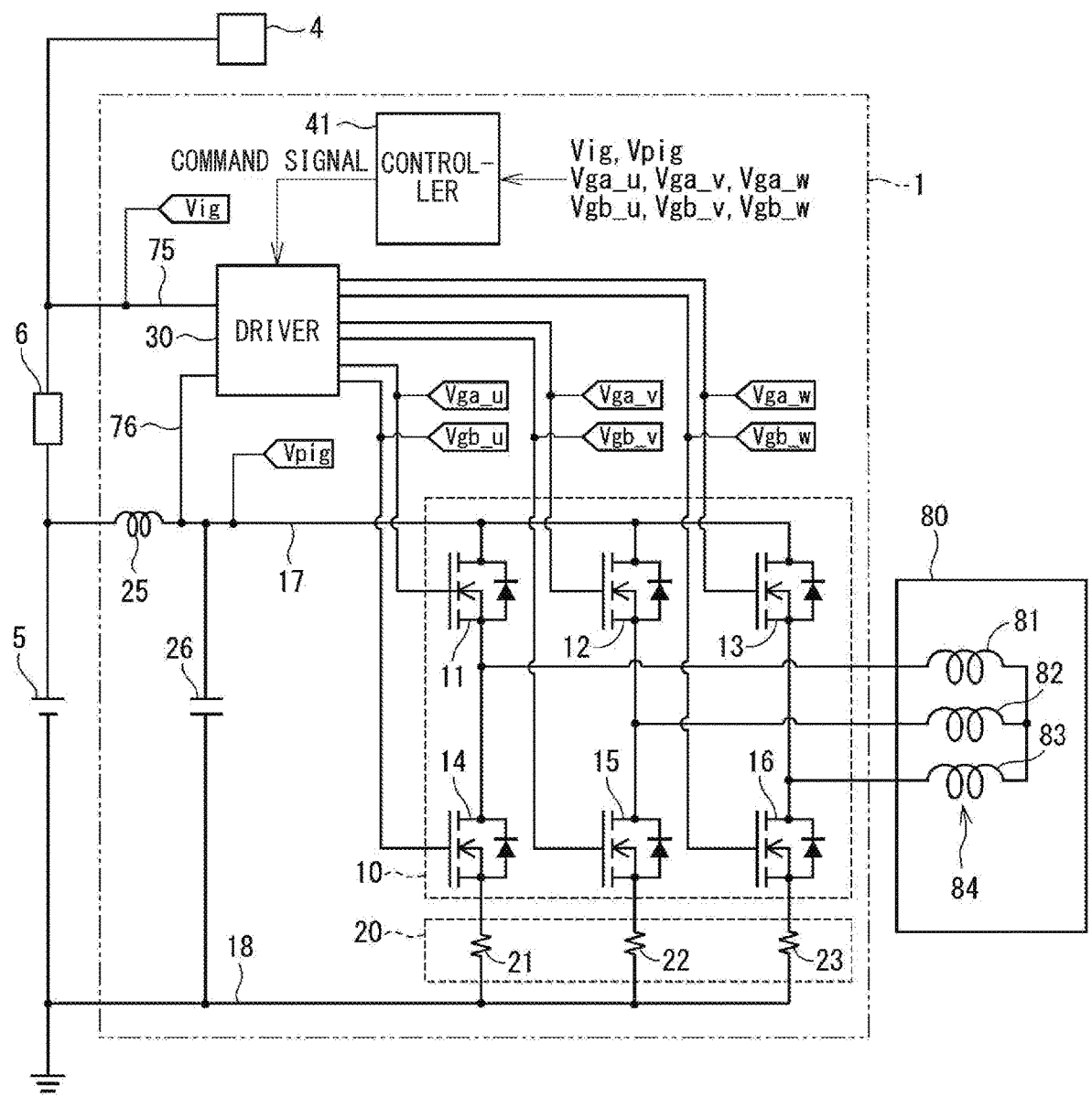
FIG. 2 is a circuit diagram illustrating a power converter according to the first embodiment.

As illustrated in FIGS. 1 and 2, a power converter 1 according to a first embodiment is used in an electric power steering system 8 for assisting steering operation of a vehicle, together with a motor 80, for example. In the present embodiment, the motor 80 corresponds to a "load" and a "rotary electric machine". FIG. 1 illustrates a configuration of a steering system 90 including the electric power steering system 8. The steering system 90 includes a steering wheel 91 being a steering member, a steering shaft 92, a pinion gear 96, a rack shaft 97, a wheel 98, the electric power steering system 8, and the like.

The steering wheel 91 is connected to the steering shaft 92. The steering shaft 92 is provided with a torque sensor 94 for detecting steering torque. The steering shaft 92 is provided at its leading end with the pinion gear 96. The pinion gear 96 meshes with the rack shaft 97. The rack shaft 97 is connected at its opposite ends to a pair of wheels 98 with a tie rod and the like. When a driver turns the steering wheel 91, the steering shaft 92 connected to the steering wheel 91 is rotated. Rotational motion of the steering shaft 92 is converted into linear motion of the rack shaft 97 by the pinion gear 96. The pair of wheels 98 is steered to an angle in accordance with displacement of the rack shaft 97.

The electric power steering system 8 includes the motor 80, a reduction gear 89 serving as a power transmission unit that transmits rotation of the motor 80 to the steering shaft 92 while reducing the rotation, the power converter 1, and the like. That is, the electric power steering system 8 of the present embodiment corresponds to a column assist type. The electric power steering system may be a rack-assist type" or the like that transmits rotation of the motor 80 to the rack shaft 97. In the present embodiment, the steering shaft 92 corresponds to an "object to be driven".

The motor 80 outputs auxiliary torque for assisting steering of the steering wheel 91 performed by a driver. The motor 80 is driven by electric power supplied from a battery being a DC power source to rotate the reduction gear 89 forward and reverse. The motor 80 is a three-phase brushless motor, and includes a rotor and a stator each of which is not illustrated.

As illustrated in FIG. 2, the motor 80 includes a U-phase coil 81, a V-phase coil 82, and a W-phase coil 83. The coils 81 to 83 constitute a coil set 84. The power converter 1 includes an inverter 10, a driver 30, a controller 41, and the like. The inverter 10 includes six switching elements 11 to 16, and converts electric power to be supplied to the coil set 84. The switching element is referred to as a "SW element". Each of the SW elements 11 to 16 of the present embodiment is a MOSFET. Each of them may be an IGBT, a thyristor, or the like.

The SW elements 11 to 13 are connected to a high potential side. The SW element 14 to 16 are connected to a low potential side. Each of the SW elements 11, 14 that are to be a pair of U-phase elements has a connection point to which one end of the U-phase coil 81 is connected. Each of the SW elements 12, 15 that are to be a pair of V-phase elements has a connection point to which one end of the V-phase coil 82 is connected. Each of the SW elements 13, 16 that are to be a pair of W-phase elements has a connection point to which one end of the W-phase coil 83 is connected. The other ends of the respective coils 81 to 83 are connected to each other.

Each of the SW elements 11 to 13 disposed on the high potential side has a drain that is connected to a cathode of a battery 5 via an upper bus 17. Each of the SW elements 14 to 16 disposed on the low potential side has a source that is connected to a ground via a lower bus 18. In the present embodiment, the upper bus 17 corresponds to the "power wiring". The SW elements 11 to 13 connected to the high potential side are each referred to as the "upper arm element". The SW elements 14 to 16 disposed on the low potential side are each referred to as the "lower arm element", as appropriate.

A current detector 20 includes a U-phase current detection element 21, a V-phase current detection element 22, and a W-phase current detection element 23, and is provided on a low potential side of the inverter 10. Specifically, the U-phase current detection element 21 is provided between the lower arm element 14 of a U-phase and the lower bus 18, the V-phase current detection element 22 is provided between the lower arm element 15 of a V-phase and the lower bus 18, and W-phase current detection element 23 is provided between the lower arm element 16 of a W-phase and the lower bus 18. The current detection elements 21 to 23 of the present embodiment are all shunt resistance. Voltage across each of the current detection elements 21 to 23 is output to the controller 41, as the corresponding one of detection values according to phase electric currents Iu, Iv, and Iw. The phase electric currents Iu, Iv, and Iw are referred to as a motor electric current I as a whole.

A coil 25 and a capacitor 26 are disposed between the battery 5 and the inverter 10 to constitute a power filter. When the power filter is provided, not only a noise transmitted from another device 4 sharing the battery 5 is reduced, but also a noise transmitted from the inverter 10 side to the other device 4 sharing the battery 5 is reduced. The coil 25 is provided in the upper bus 17. The capacitor 26 is connected to the upper bus 17 and lower bus 18 on the inverter 10 side of the coil 25.

The driver 30 receives electric power supplied from control wiring 75 and a branch line 76. The control wiring 75 is connected to the battery 5, and is provided with a starting switch 6 being an ignition switch. The branch line 76 is connected between the coil 25 in the upper bus 17 and the capacitor 26. The driver 30 applies gate voltage to a gate of each of the SW elements 11 to 16 in response to a command signal from the controller 41. Specifically, the driver 30 applies gate voltage Vga_u to the gate of the SW element 11, applies gate voltage Vga_v to the gate of the SW element 12, and applies gate voltage Vga_w to the gate of the SW element 13. The driver 30 also applies gate voltage Vgb_u to the gate of the SW element 14, applies gate voltage Vgb_v to the gate of the SW element 15, and applies gate voltage Vgb_w to the gate of the SW element 16.

The lower gate voltages Vgb_u, Vgb_v, and Vgb_w, being applied to the lower arm elements 14 to 16, respectively, are substantially equal to power wiring voltage Vpig being voltage in the upper bus 17 and control wiring voltage Vig being voltage in the control wiring 75. The upper gate voltages Vga_u, Vga_v, and Vga_w, to be applied to the upper arm elements 11 to 13, respectively, are increased more than the lower gate voltages Vgb_u, Vgb_v, and Vgb_w, respectively, by a charge pump circuit or the like. The upper gate voltages Vga_u, Vga_v, and Vga_w are referred to as upper gate voltage Vga as a whole, and the lower gate voltages Vgb_u, Vgb_v, and Vgb_w are referred to as lower gate voltage Vgb as a whole. In addition, the control wiring voltage Vig and the power wiring voltage Vpig are referred to as input voltage Vin as a whole.

The controller 41 includes a microcomputer, and is provided in its inside with a CPU, a ROM (corresponding to a readable non-transitory tangible storage medium), a RAM, an I/O, a bus line connecting these components, and the like, each of which is not illustrated. Each process in the controller 41 may be a software process in which the CPU executes a program pre-stored in a tangible memory device like the ROM, or a hardware process performed by a dedicated electronic circuit. The same applies to controllers 42 to 44 described below.

Figure 3:
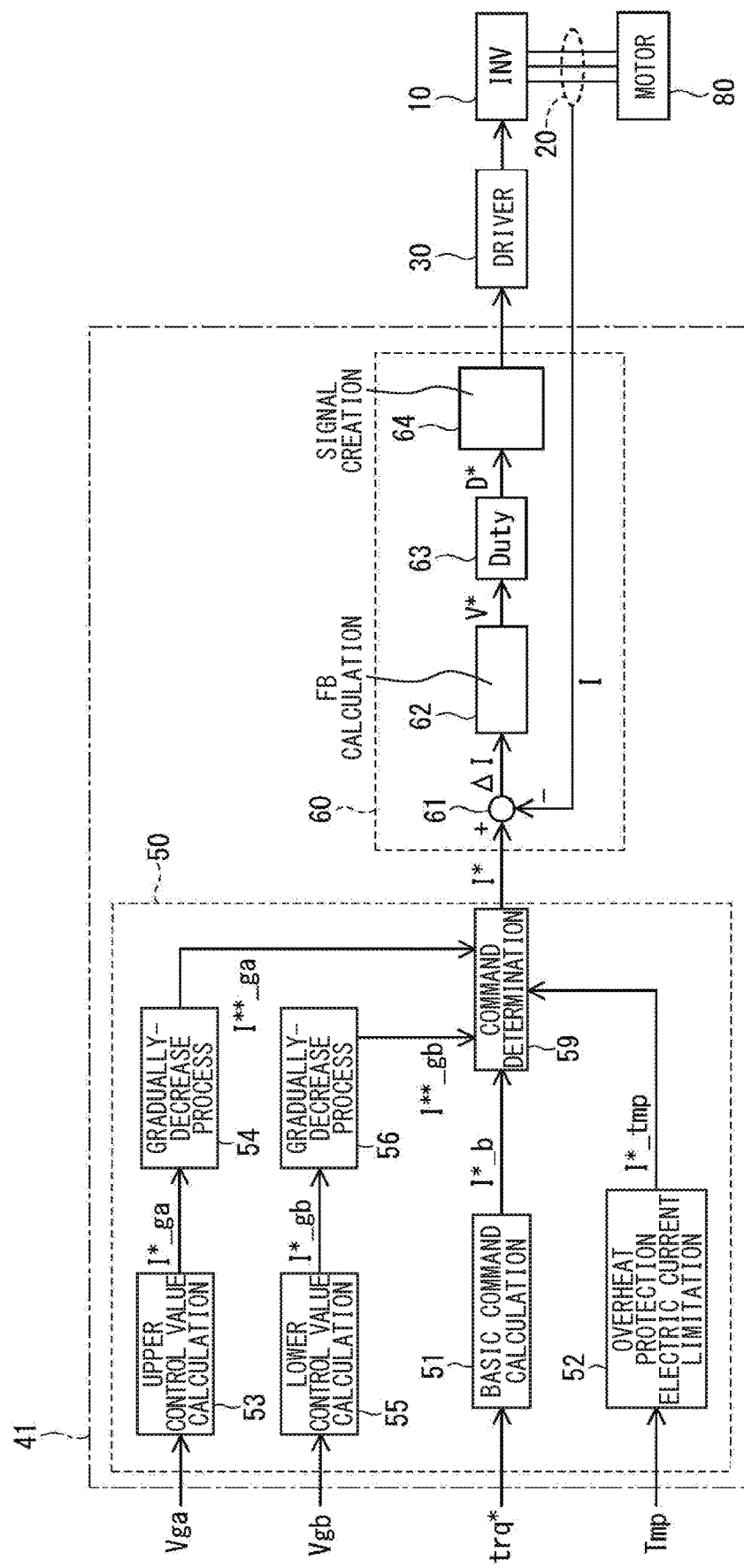
FIG. 3 is a block diagram illustrating a controller according to the first embodiment.

As illustrated in FIG. 3, the controller 41 includes a current command calculator 50, and a drive controller 60. The current command calculator 50 includes a basic command calculator 51, an overheat protection electric current limiter 52, an upper limit value calculator 53, a gradually-decrease processor 54, a lower limit value calculator 55, a gradually-decrease processor 56, and a command determiner 59, to calculate a current command value I*. The current command value I* may be a value in any dimension such as a three-phase value, or a value in a dq-axis, and an index related to a phase or an axis is appropriately eliminated. The basic command calculator 51 calculates a basic current command value I*_b in accordance with a torque command value trq*. The overheat protection electric current limiter 52 calculates a temperature-reference current limit value I*_tmp suitable for temperature of the SW elements 11 to 16. The temperature of the SW elements 11 to 16 may be a value based on a detection value of a temperature sensor, or an estimate based on an electric current or the like.

The upper limit value calculator 53 calculates an upper basic electric current limit value I*_ga in accordance with the upper gate voltage Vga. In the present embodiment, the upper basic electric current limit value I*_ga is calculated with a map calculation based on a minimum value of the upper gate voltage Vga. The minimum value of the upper gate voltage Vga is referred to as upper minimum gate voltage Vga_#. The gradually-decrease processor 54 performs a fading process of fading the upper basic electric current limit value I*_ga with an LPF process or the like, for example, to calculate an upper electric current limit value I**_ga. When the upper minimum gate voltage Vga_# does not decrease, and electric current limitation based on gate voltage of the upper arm elements 11 to 13 is not performed, the fading process is not also performed.

The lower limit value calculator 55 calculates a lower basic electric current limit value I*_gb in accordance with the lower gate voltage Vgb. In the present embodiment, the lower basic electric current limit value I*_gb is calculated with a map calculation based on a minimum value of the lower gate voltage Vgb. The minimum value of the lower gate voltage Vgb is referred to as lower minimum gate voltage Vgb_#. The gradually-decrease processor 56 performs a fading process of fading the lower basic electric current limit value I*_gb with the LPF process or the like, for example, to calculate a lower electric current limit value I**_gb. When the lower minimum gate voltage Vgb# does not decrease, and electric current limitation based on gate voltage of the lower arm elements 14 to 16 is not performed, the fading process is not also performed.

The command determiner 59 determines the current command value I* in accordance with the basic current command value I*_b, the temperature reference current limit value I*_tmp, and the electric current limit values I_ga and I_gb of voltage reference. In the present embodiment, a minimum value of four values is set as the current command value I* with minimum selection. Description is made assuming that the upper electric current limit value I_ga or the lower electric current limit value I_gb is selected as the current command value I*.

The drive controller 60 includes a subtractor 61, an electric current FB calculator 62, a duty calculator 63, and a signal generator 64. The subtractor 61 calculates an electric current deviation ΔI that is a deviation between the current command value I* and the motor electric current I fed back from the current detector 20. The electric current FB calculator 62 calculates a voltage command value V* with PI calculation or the like, for example, such that the electric current deviation ΔI converges to zero.

The duty calculator 63 calculates a duty command value D* in accordance with the voltage command value V* or the like. The signal generator 64 generates a command signal for controlling on-off operation of the SW elements 11 to 16, in accordance with the duty command value D*, and outputs the command signal to the driver 30. The driver 30 applies the gate voltages Vga_u, Vga_v, Vga_w, Vgb_u, Vgb_v, and Vgb_w to the corresponding SW elements 11 to 16 in response to the command signal. When the SW elements 11 to 16 are turned on or off in accordance with the gate voltages Vga_u, Vga_v, Vga_w, Vgb_u, Vgb_v, and Vgb_w, drive of the motor 80 is controlled.

Figure 4:
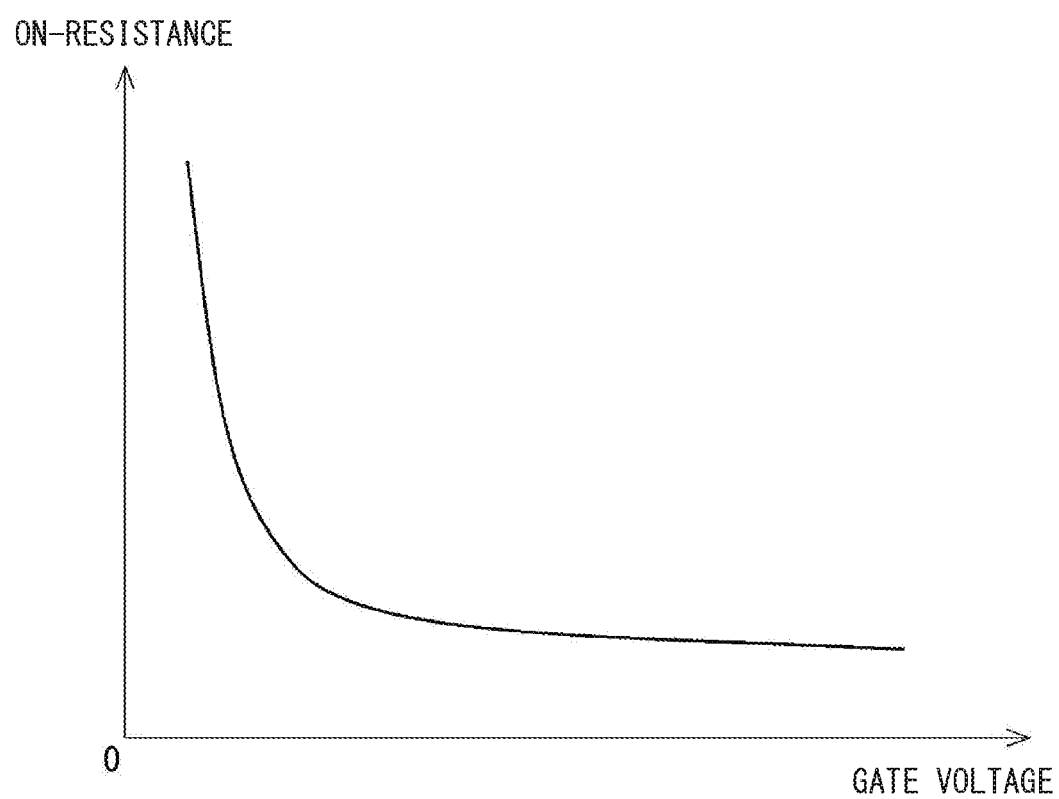
FIG. 4 is a graph describing a relationship between gate voltage and on-resistance of a MOSFET.

FIG. 4 illustrates characteristics of a MOSFET. In FIG. 4, the horizontal axis represents gate voltage, and the vertical axis represents on-resistance. As illustrated in FIG. 4, the MOSFET has the on-resistance that changes according to the gate voltage. Specifically, as the gate voltage decreases, the on-resistance increases. In the present embodiment, the MOSFET is used for each of the SW elements 11 to 16, so that when the gate voltage is low, the on-resistance increases, and thus heat generation of each of the SW elements 11 to 16 increases. Thus, in the present embodiment, when the gate voltage is low, the amount of electric current supply to the SW elements 11 to 16 is reduced to continue assisting steering as long as possible while thermal destruction of each of the SW elements 11 to 16 is avoided. The process of suppressing electric current supply includes an electric current limiting process of limiting the current command value I*, and a duty changing process of changing the duty command value D*. In the present embodiment, the electric current limiting process will be mainly described.

Figure 5:
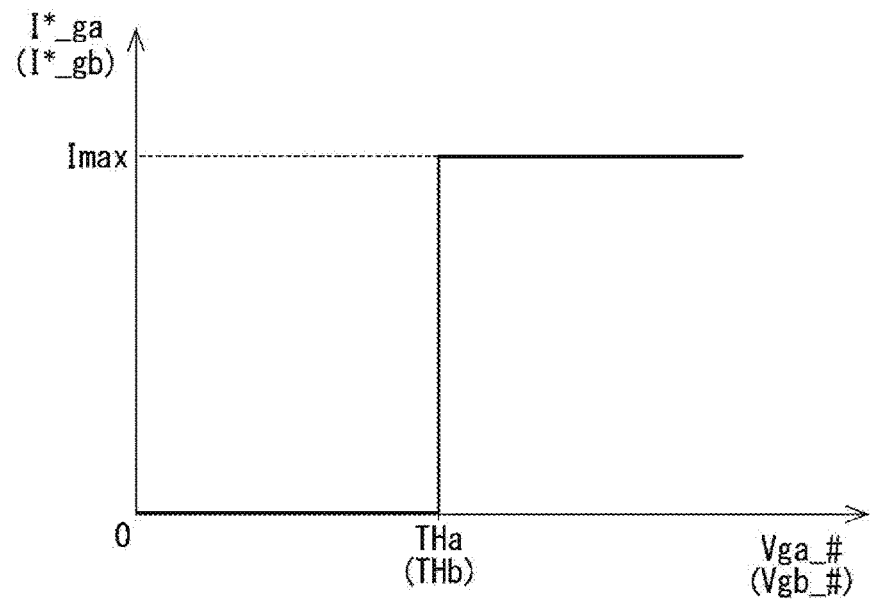
FIG. 5 is a graph describing a map to be used for calculation of an electric current limit value in accordance with gate voltage.
Figure 6:
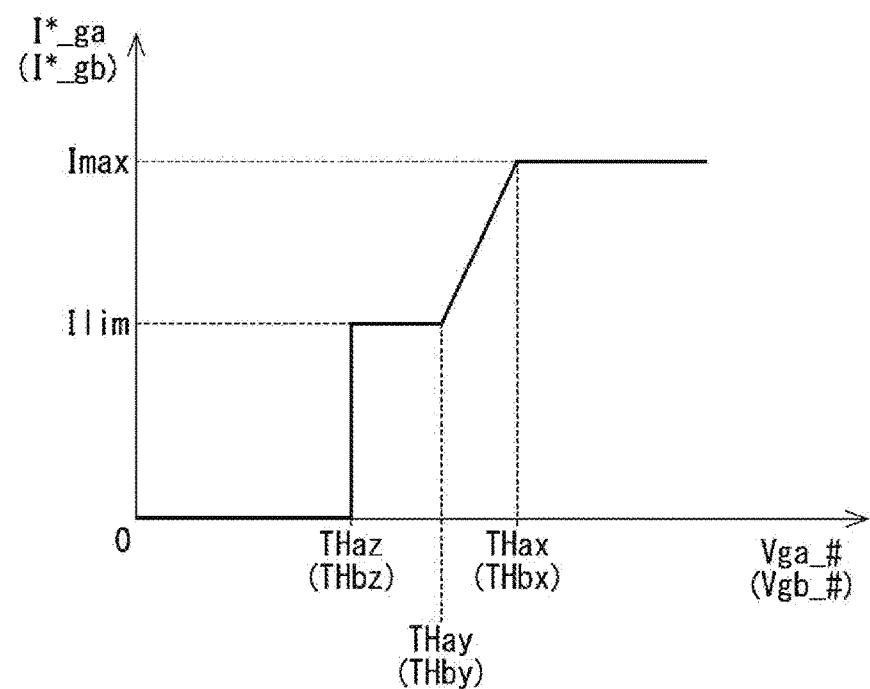
FIG. 6 is a graph describing a map to be used for calculation of an electric current limit value in accordance with gate voltage.

The electric current limiting process will be described with reference to FIGS. 5 and 6. FIGS. 5 and 6 each illustrates an example of a map to be used for calculation of each of the basic electric current limit values I*_ga and I*_gb in the corresponding one of the upper limit value calculator 53 and the lower limit value calculator 55. In both of FIGS. 5 and 6, the horizontal axis represents the corresponding one of the minimum gate voltages Vga_# and Vgb_#, and the vertical axis represents the corresponding one of the basic electric current limit values I*_ga and I*_gb. FIGS. 5 and 6 each illustrates a value in parentheses that is related to calculation in the lower limit value calculator 55. The same applies to FIG. 10 described below.

As illustrated in FIG. 5, the upper limit value calculator 53 does not limit electric current when the upper minimum gate voltage Vga_# is equal to or more than an upper determination threshold value THa, and sets the upper basic electric current limit value I*_ga as a maximum value Imax. When the upper minimum gate voltage Vga_# is less than the upper determination threshold value THa, the upper basic electric current limit value I*_ga is set to zero. The lower limit value calculator 55 does not limit electric current when the lower minimum gate voltage Vgb_# is equal to or more than a lower determination threshold value THb, and sets the lower basic electric current limit value I*_gb as the maximum value Imax. When the lower minimum gate voltage Vgb_# is less than the lower determination threshold value THb, the lower basic electric current limit value I*_gb is set to zero. It may be possible to immediately limit the electric current when gate voltage decreases.

In place of the map illustrated in FIG. 5, the map illustrated in FIG. 6 may be used. As illustrated in FIG. 6, the upper limit value calculator 53 does not limit electric current when the upper minimum gate voltage Vga_# is equal to or more than a first determination threshold value THax, and sets the upper basic electric current limit value I*_ga as the maximum value Imax. When the upper minimum gate voltage Vga_# is equal to or more than a second determination threshold value THay, and is less than the first determination threshold value THax, the upper limit value calculator 53 reduces the upper basic electric current limit value I*_ga as the upper minimum gate voltage Vga_# decreases. While in the example of FIG. 6, the upper basic electric current limit value I*_ga linearly decreases as voltage decreases, the upper basic electric current limit value I*_ga may decrease nonlinearly. When the upper minimum gate voltage Vga_# is equal to or more than a third determination threshold value THaz, and is less than the second determination threshold value THay, the upper limit value calculator 53 sets the upper basic electric current limit value I*_ga as a predetermined limitation value Ilim. When the upper minimum gate voltage Vga_# is less than the third determination threshold value Vg_thz, the upper limit value calculator 53 sets the upper basic electric current limit value I*_ga as zero.

The lower limit value calculator 55 may calculate the lower basic electric current limit value I*_gb by replacing the upper minimum gate voltage Vga_# with the lower minimum gate voltage Vgb_#, and by replacing the determination threshold values THax, THay, and THaz with determination threshold values THbx, THby, and THbz, respectively. The map of FIG. 6 is suitably used when gate voltage becomes a low voltage state with a relatively low frequency. When the basic electric current limit values I*_ga and I*_gb are reduced stepwise in accordance with a degree of decrease in gate voltage, assist is continued as long as possible.

The power converter 1 is mounted in a vehicle, and the battery 5 is shared with the other device 4. Thus, multiple loads including the motor 80 extracts electric power to reduce voltage to be applied to the inverter 10, so that the gate voltages Vga and Vgb may decrease. While FIG. 2 illustrates the device 4 in one block, the device 4 may be provided in multiple blocks. The device 4 may be connected closer to the battery 5 than the starting switch 6.

In the present embodiment, a MOSFET is used for each of the SW elements 11 to 16. Thus, when the gate voltages Vga and Vgb decrease, on-resistance increases to increase heat generation of each of the SW elements 11 to 16. In the present embodiment, when the gate voltages Vga and Vgb decrease, the amount of electric current supply to each of the SW elements 11 to 16 is suppressed to suppress heat generation of each of the SW elements 11 to 16. Specifically, when gate voltage decreases, the current command value I* is limited to limit electric current that flows into the motor 80. As a result, even when gate voltage temporarily decreases, heat generation of each of the SW elements 11 to 16 is suppressed to enable thermal destruction of each of the SW elements 11 to 16 to be avoided while assist is continued as long as possible.

As described above, the power converter 1 includes the inverter 10, the driver 30, and the controller 41. The inverter 10 includes the upper arm elements 11 to 13 connected to the high potential side, and the lower arm elements 14 to 16 connected to the low potential sides of the upper arm elements 11 to 13, respectively, to convert electric power supplied from the battery 5 via the upper bus 17 and supply the electric power to the motor 80. The driver 30 receives electric power supplied from the battery 5 via the control wiring 75, and applies each of the gate voltages Vga and Vgb to the corresponding one of the upper arm elements 11 to 13 and the lower arm elements 14 to 16. The controller 41 includes the drive controller 60 that controls operation of the upper arm elements 11 to 13 and the lower arm elements 14 to 16.

The battery 5 also supplies electric power to the device 4 other than the inverter 10. The controller 41 limits electric current that flows into the motor 80, in accordance with the gate voltages Vga and Vgb, or the gate voltages Vga and Vgb, and the input voltage Vin that is the power wiring voltage Vpig being voltage of the upper bus 17 or the control wiring voltage Vig being voltage of the control wiring 75. In the present embodiment, electric current that flows into the motor 80 is limited in accordance with the gate voltages Vga and Vgb.

In the present embodiment, a MOSFET is used for each of the SW elements 11 to 16. Thus, when the gate voltages Vga and Vgb decrease, on-resistance increases to increase heat generation. In the present embodiment, electric current is limited in accordance with the gate voltages Vga and Vgb, so that heat generation of each of the SW elements 11 to 16 when the gate voltage decreases is suppressed. It may be possible to continue supply of electric power to the motor 80 while protecting the inverter 10, without providing a separate circuit to suppress decrease in gate voltage.

The controller 41 includes the upper limit value calculator 53, the lower limit value calculator 55, and the gradually-decrease processors 54, 56. The upper limit value calculator 53 calculates the basic electric current limit value I*_ga suitable for the upper gate voltage Vga. The lower limit value calculator 55 calculates the basic electric current limit value I*_gb suitable for the lower gate voltage Vgb. The gradually-decrease processors 54, 56 fade the basic electric current limit values I*_ga and I*_gb to calculate the electric current limit values I_ga and I_gb, respectively. It may be possible to prevent sudden change in electric current that flows into the motor 80.

The electric power steering system 8 includes the power converter 1, the motor 80 being a load, and the reduction gear 89. The motor 80 outputs assist torque for assisting steering of the steering wheel 91 performed by a driver. The reduction gear 89 transmits driving force of the motor 80 to the steering shaft 92. The power converter 1 is used in the electric power steering system 8. In the present embodiment, when gate voltage decreases, electric current that flows into the motor 80 is limited to maintain electric power supply to the motor 80 while the inverter 10 is protected. As a result, even when the gate voltage decreases, it may be possible to continue assist of steering.

In the present embodiment, the upper limit value calculator 53 and the lower limit value calculator 55 each correspond to the "basic electric current limit value calculator".

Second Embodiment

Figure 7:
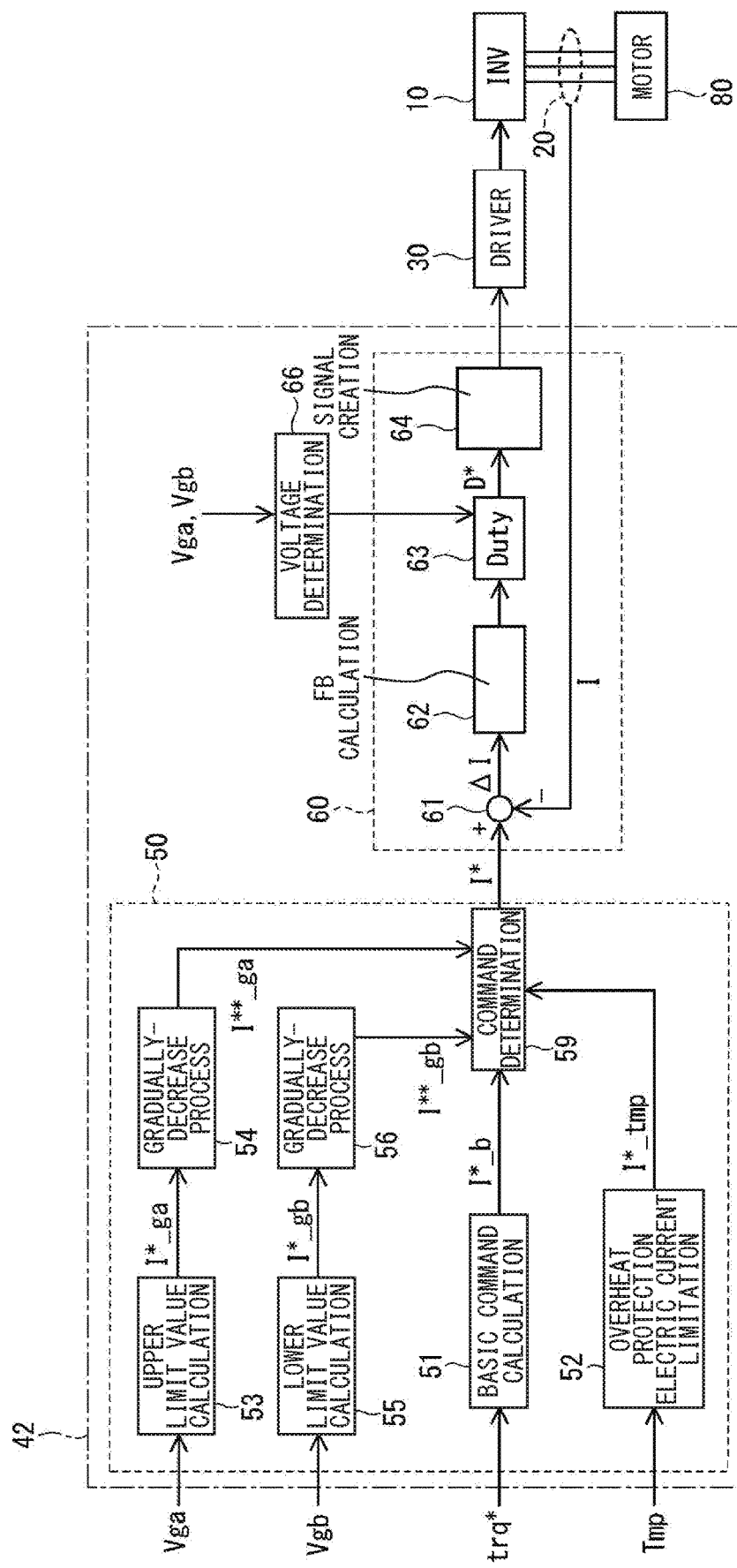
FIG. 7 is a block diagram illustrating a controller according to a second embodiment.

A second embodiment is illustrated in FIGS. 7 to 10. An electric current limiting process of the present embodiment is similar to that in the embodiment described above, and here the duty changing process is mainly described. As illustrated in FIG. 7, a controller 42 of the present embodiment includes a current command calculator 50, a drive controller 60, and a voltage determination section 66. The voltage determination section 66 determines upper gate voltage Vga and lower gate voltage Vgb by comparison with respective determination threshold values, and outputs determination results to a duty calculator 63. In the present embodiment, when upper minimum gate voltage Vga_# is less than an upper determination threshold value THa, it is determined that the upper gate voltage Vga is in a low voltage state. When lower minimum gate voltage Vgb_# is less than a lower determination threshold value THb, it is determined that the lower gate voltage Vgb is in a low voltage state. The determination threshold values THa and THb each correspond to the "gate determination threshold value". The duty calculator 63 changes a duty command value D* in accordance with a voltage determination result in the voltage determination section 66.

Figure 8:
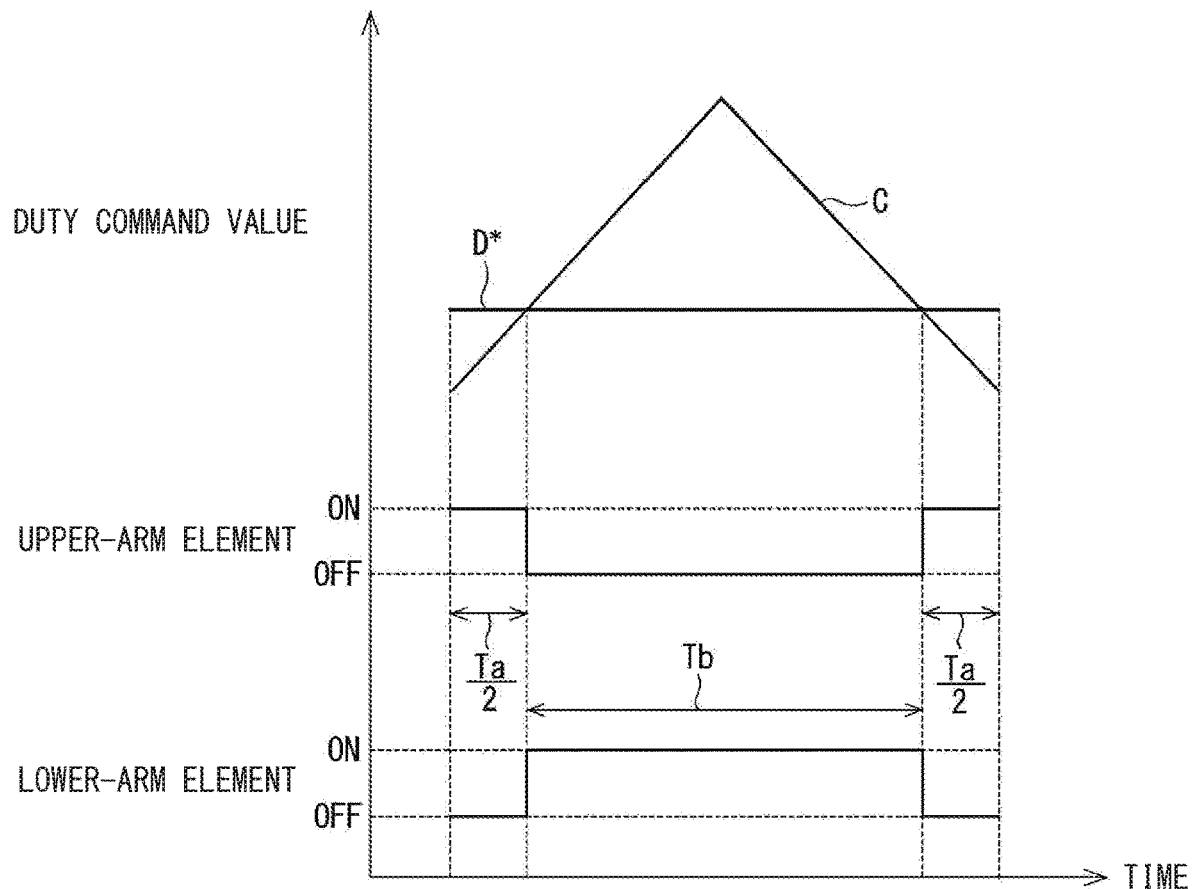
FIG. 8 is a graph describing a relationship between a duty command value and on-time of each of an upper arm element and a lower arm element.
Figure 9:
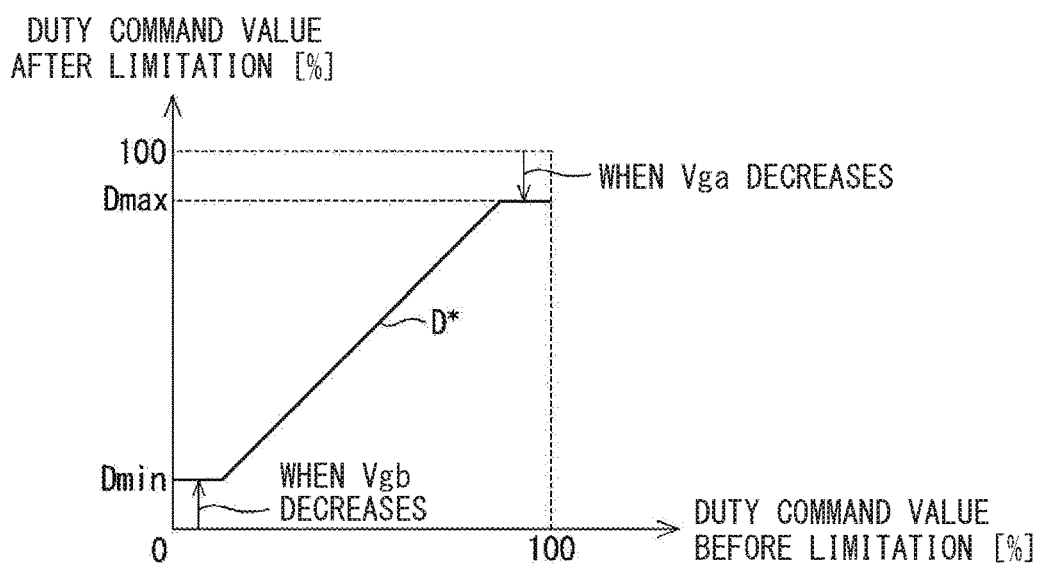
FIG. 9 is a graph describing upper and lower limits of a duty command value in accordance with gate voltage, according to the second embodiment.

The duty changing process will be described with reference to FIGS. 8 to 10. FIG. 8 has the horizontal axis as a common time axis, and illustrates a duty command value D* and a carrier wave C, a switching state of an upper arm element, and a switching state of a lower arm element, for one cycle of the carrier wave, in order from an upper-row. A U-phase will be described, as an example. When on-off of each of SW elements 11, 14 is switched, dead time is provided; however, description related to the dead time is eliminated.

When the duty command value D* exceeds the carrier wave C, the upper arm element 11 is turned on, and the lower arm element 14 is turned off. In contrast, when the duty command value D* is below the carrier wave C, the upper arm element 11 is turned off, and the lower arm element 14 is turned on. That is, time of electric current supply to each of the SW elements 11 to 16 varies in accordance with the duty command value D*. Specifically, as the duty command value D* increases, time Ta in which electric current flows into each of the upper arm elements 11 to 13 increases and time Tb in which electric current flows into each of the lower arm elements 14 to 16 decreases. As the duty command value D* decreases, the time Ta in which electric current flows into each of the upper arm elements 11 to 13 decreases and the time Tb in which electric current flows into each of the lower arm elements 14 to 16 increases. The time Ta in which each of the upper arm elements 11 to 13 is turned on is divided into a first half and a second half of one cycle of the carrier wave C, so that each of the first half and the second half is indicated as (½)Ta in FIG. 8. In the present embodiment, when gate voltage becomes the low voltage state, upper and lower limits of the duty command value D* are limited to reduce time of electric current supply to the SW element in which gate voltage decreases. In FIG. 9, the horizontal axis represents a value before the limitation, and the vertical axis represents a value after the limitation. As illustrated in FIG. 9, when the upper minimum gate voltage Vga_# is less than the upper determination threshold value THa to be determined as the low voltage state, a maximum value of the duty command value D* is limited to an upper limit value Dmax less than 100%. When the lower minimum gate voltage Vgb_# is less than the lower determination threshold value THb to be determined as the low voltage state, a minimum value of the duty command value D* is limited to a lower limit value Dmin more than 0%. The upper determination threshold value THa and the lower determination threshold value THb each may be equal to a value related to electric current limitation, or different from the value. The upper limit value Dmax and the lower limit value Dmin each may be a predetermined value, or may be variable in accordance with the minimum gate voltages Vga_# and Vgb_#.

Figure 10:
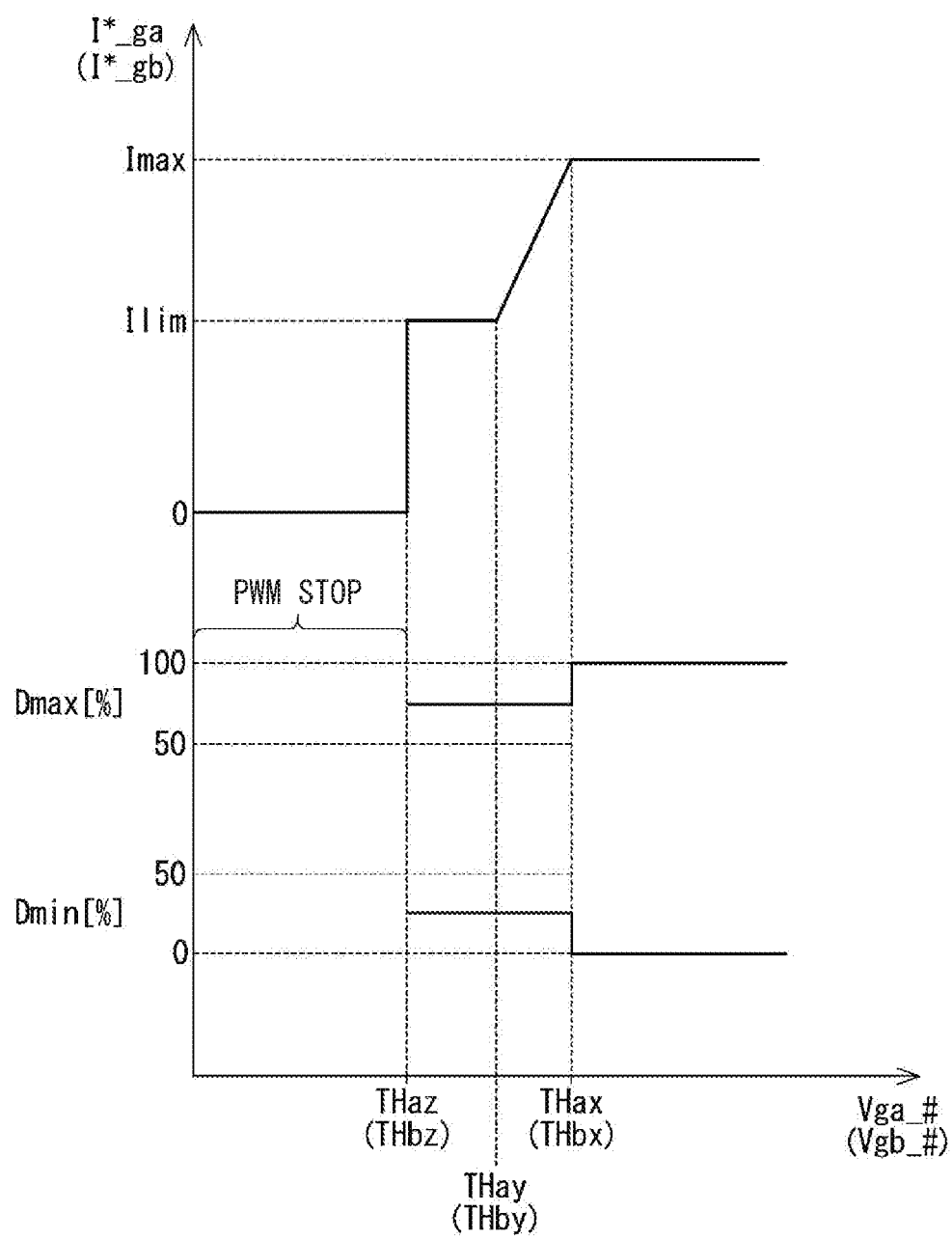
FIG. 10 is a graph describing a limitation of electric current and a limitation of duty in accordance with gate voltage, according to the second embodiment.

FIG. 10 illustrates an example of when electric current is limited using the map of FIG. 6, and has the horizontal axis representing minimum gate voltage while illustrating an electric current limit value, the upper limit value Dmax of the duty command value D*, and the lower limit value Dmin thereof, in order from an upper-row. The electric current limit value is similar to that in FIG. 6, so that description thereof is eliminated. In the example of FIG. 10, when the upper minimum gate voltage Vga_# is equal to or more than the first determination threshold value THax, the upper limit value Dmax of the duty command value D* is set to 100%, and thus an upper limit of the duty command value D* is not limited. When the upper minimum gate voltage Vga_# is equal to or more than the third determination threshold value THaz and less than the first determination threshold value THax, the upper limit value Dmax is set to a predetermined value more than 50% and less than 100% (e.g., 75%). When the upper minimum gate voltage Vga_# is less than the third determination threshold value THaz, PWM control is stopped to turn off the SW elements 11 to 16.

When the lower minimum gate voltage Vgb_# is equal to or more than the first determination threshold value THbx, the lower limit value Dmin of the duty command value D* is set to 0%, and thus a lower limit of the duty command value D* is not limited. When the lower minimum gate voltage Vgb_# is equal to or more than the third determination threshold value THbz and less than the first determination threshold value THbx, the lower limit value Dmin is set to a predetermined value more than 0% and less than 50% (e.g., 25%). When the lower minimum gate voltage Vgb_# is less than the third determination threshold value THbz, the PWM control is stopped to turn off the SW elements 11 to 16. In the example of FIG. 10, the determination threshold values THax and THbx each correspond to the "gate determination threshold value".

In the present embodiment, when the gate voltage Vga of each of the upper arm elements 11 to 13 decreases, the upper limit of the duty command value D* is limited to reduce on-time of each of the upper arm elements 11 to 13, and thus an integrated amount of electric current supply is suppressed. When the gate voltage of each of the lower arm elements 14 to 16 decreases, the lower limit of the duty command value D* is limited to reduce on-time of each of the lower arm elements 14 to 16, and thus the integrated amount of electric current supply is suppressed. As a result, even when gate voltage temporarily decreases, heat generation of each of the SW elements 11 to 16 is suppressed to enable thermal destruction of each of the SW elements 11 to 16 to be avoided while assist is continued as long as possible.

In the present embodiment, the drive controller 60 includes the duty calculator 63 that calculates the duty command value D* related to on-time of each of the SW elements 11 to 16. The duty calculator 63 limits the duty command value D* when at least one of the gate voltages Vga and Vgb of the corresponding upper arm elements 11 to 13 and lower arm elements 14 to 16 is in a low gate voltage state of being less than the determination threshold value THa or THb.

Specifically, when the upper gate voltage Vga is in the low gate voltage state of being less than the upper determination threshold value THa, the duty calculator 63 reduces the upper limit value of the duty command value D* to be less than when the upper gate voltage Vga is not in the low gate voltage state. When the lower gate voltage Vgb is in the low gate voltage state of being less than the lower determination threshold value THb, the duty calculator 63 increases the lower limit value of the duty command value D* to be more than when the lower gate voltage Vgb is not in the low gate voltage state. Accordingly, time of electric current supply to an arm which is in the low gate voltage state is reduced, so that heat generation of an element in which gate voltage decreases can be suppressed. Effects similar to those of the embodiment described above are achieved.

Third Embodiment

Figure 11:
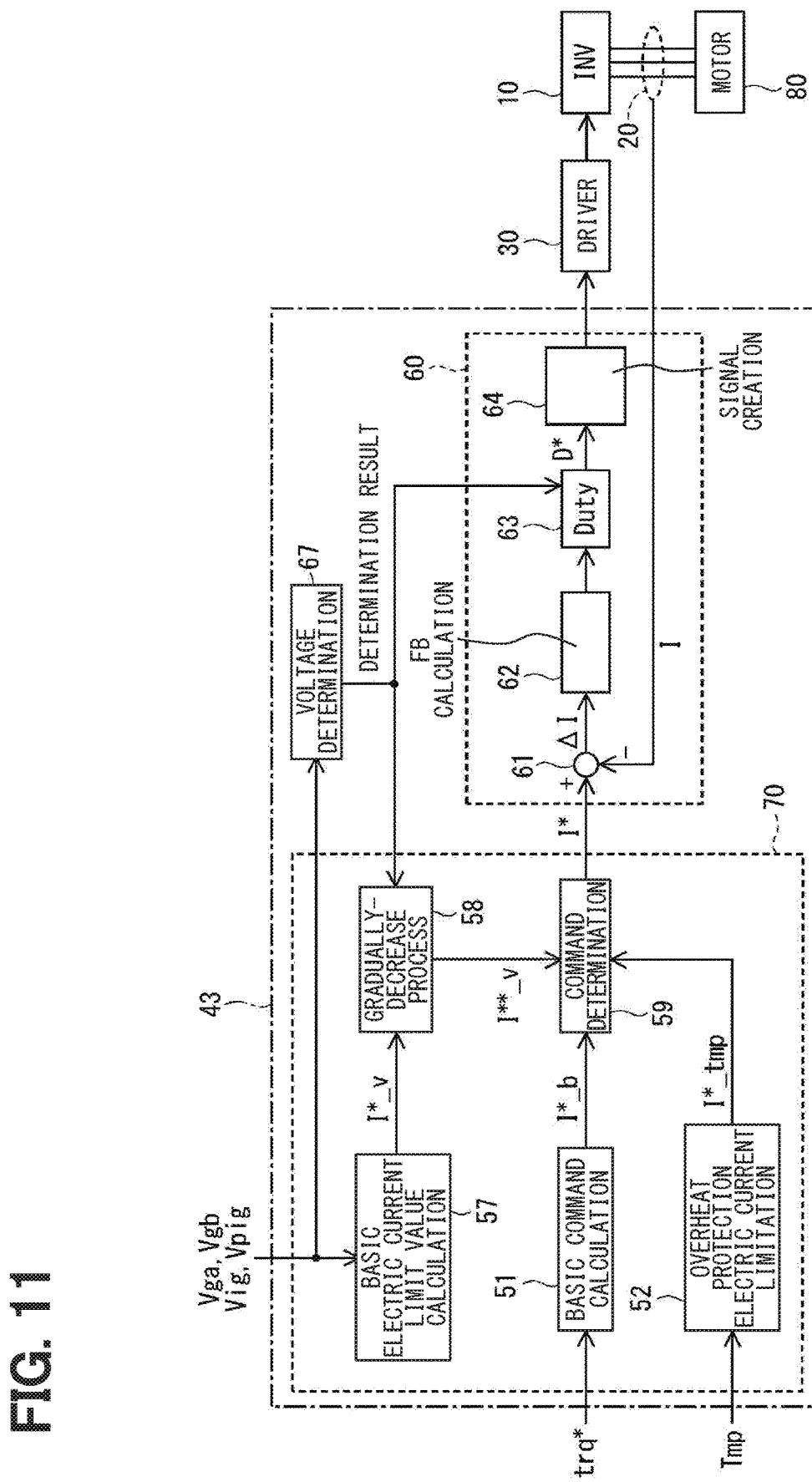
FIG. 11 is a block diagram illustrating a controller according to a third embodiment.
Figure 12:
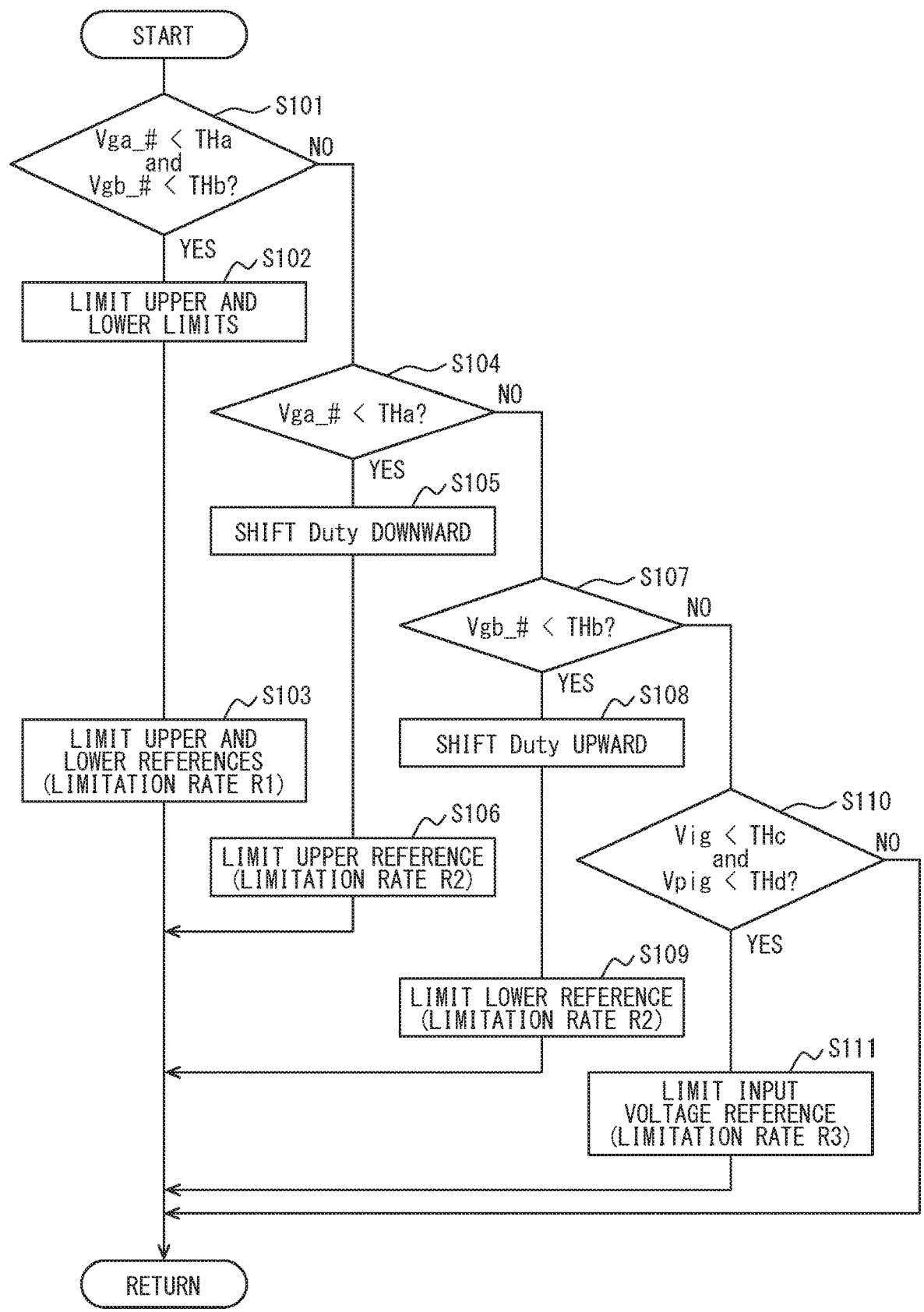
FIG. 12 is a flowchart illustrating a process of suppressing electric current supply of the third embodiment.

A power converter according to a third embodiment is illustrated in FIGS. 11 and 12. As illustrated in FIG. 11, a controller 43 of the present embodiment includes a current command calculator 70, a drive controller 60, and a voltage determination section 67. The current command calculator 70 includes a basic command calculator 51, an overheat protection electric current limiter 52, a basic electric current limit value calculator 57, a gradually-decrease processor 58, and a command determiner 59. The basic electric current limit value calculator 57 calculates a basic electric current limit value I*_v in accordance with upper gate voltage Vga, lower gate voltage Vgb, power wiring voltage Vpig, or control wiring voltage Vig. The gradually-decrease processor 58 performs a fading process on the basic electric current limit value I*_v in accordance with a voltage determination result in the voltage determination section 67 to calculate an electric current limit value I**_v.

The voltage determination section 67 determines the upper gate voltage Vga, the lower gate voltage Vgb, the power wiring voltage Vpig, and the control wiring voltage Vig by comparison with respective determination threshold values, and outputs determination results to the gradually-decrease processor 58 and the duty calculator 63. The duty calculator 63 changes duty in accordance with a voltage determination result in the voltage determination section 67.

A process of suppressing electric current supply of the present embodiment will be described with reference to the flowchart of FIG. 12. The process of suppressing electric current supply is performed by the controller 43 in a predetermined cycle. In the term of step S101, "step" is eliminated, and a symbol, "S" is simply indicated. The same applies to other steps.

At first S101, the voltage determination section 67 determines whether upper minimum gate voltage Vga_# is less than an upper determination threshold value THa, and lower minimum gate voltage Vgb_# is less than a lower determination threshold value THb. When it is at least determined that the upper minimum gate voltage Vga_# is equal to or more than the upper determination threshold value THa, or the lower minimum gate voltage Vgb_# is equal to or more than the lower determination threshold value THb (NO at S101), processing proceeds to S104. When it is determined that the upper minimum gate voltage Vga_# is less than the upper determination threshold value THa and the lower minimum gate voltage Vgb_# is less than the lower determination threshold value THb (YES at S101), the processing proceeds to S102.

At S102, the duty calculator 63 limits upper and lower limits of a duty command value D* in accordance with the upper minimum gate voltage Vga_# and the lower minimum gate voltage Vgb_#. The upper and lower limits of the duty command value D* are limited. Details of limiting upper and lower limits of duty are as in the description of the second embodiment.

At S103, the basic electric current limit value calculator 57 limits electric current in accordance with the upper minimum gate voltage Vga_# and the lower minimum gate voltage Vgb_#. Specifically, a basic electric current limit value I*_ga is calculated in accordance with the upper minimum gate voltage Vga_#, and a basic electric current limit value I*_gb is calculated in accordance with the lower minimum gate voltage Vgb_#. A method of calculating the basic electric current limit values I*_ga and I*_gb is similar to that in the first embodiment. The basic electric current limit value calculator 57 sets a smaller value of the electric current limit values I*_ga and I*_gb as the basic electric current limit value I*_v. The gradually-decrease processor 58 performs a fading process at a first electric current limitation rate R1 to calculate the electric current limit value I_v. The electric current limitation rate is an amount of decrease in electric current per unit time, and the first electric current limitation rate R1 is set to a value allowing the electric current limit value I_v to drop to the basic electric current limit value I*_v in an order of a few tens ms, for example.

At S104, the voltage determination section 67 determines whether the upper minimum gate voltage Vga_# is less than the upper determination threshold value THa. When it is determined that the upper minimum gate voltage Vga_# is equal to or more than the upper determination threshold value THa (NO at S104), the processing proceeds to S107. When it is determined that the upper minimum gate voltage Vga_# is less than the upper determination threshold value THa (YES at S104), the processing proceeds to S105.

S105 is a step to which the processing proceeds when the upper minimum gate voltage Vga_# is less than the upper determination threshold value THa and the lower minimum gate voltage Vgb_# is equal to or more than the lower determination threshold value THb. At S105, the duty calculator 63 shifts the duty command value D* downward to reduce neutral point voltage to be applied to a coil set 84. For example, when a predetermined value is subtracted from a duty command value of each of phases, the neutral point voltage decreases. In addition, the duty command value D* may be modulated such that a minimum duty command value in the phases is set to a lower limit value, for example. The lower limit value may be a predetermined value, or may be variable in accordance with the upper minimum gate voltage Vga_#. When the duty command value D* is modulated such that the minimum duty command value in the phases is set to the lower limit value, the upper arm elements 11 to 13 are each turned off. As a result, the upper arm elements 11 to 13 can be further protected against decrease in the gate voltage Vga. The neutral point voltage is an average value of voltages applied to respective coils 81 to 83. Thus, even when the neutral point voltage is changed, drive of a motor 80 is not affected as long as line voltage does not change.

At S106, the basic electric current limit value calculator 57 sets the basic electric current limit value I*_ga calculated in accordance with the upper minimum gate voltage Vga_# to the basic electric current limit value I*_v. The gradually-decrease processor 58 performs a fading process at a second electric current limitation rate R2 to calculate the electric current limit value I_v. The second electric current limitation rate R2 is a value allowing the electric current limit value I_v to drop to the basic electric current limit value I*_v in an order of a few tens ms, for example, the value being equal to or less than the first electric current limitation rate R1. That is, R1 is equal to or more than R2, and thus the first electric current limitation rate R1 and the second electric current limitation rate R2 may be equal to each other.

At S107, the voltage determination section 67 determines whether the lower minimum gate voltage Vgb_# is less than the lower determination threshold value THb. When it is determined that the lower minimum gate voltage Vgb_# is equal to or more than the lower determination threshold value THb (NO at S107), the processing proceeds to S110. When it is determined that the lower minimum gate voltage Vgb_# is less than the lower determination threshold value THb (YES at S107), the processing proceeds to S108.

S108 is a step to which the processing proceeds when the lower minimum gate voltage Vgb_# is less than the lower determination threshold value THb and the upper minimum gate voltage Vga_# is equal to or more than the upper determination threshold value THa. At S108, the duty calculator 63 shifts duty upward to increase neutral point voltage of the duty command value D*. For example, when a predetermined value is added to duty of each of phases, the neutral point voltage increases. In addition, the duty command value D* may be modulated such that a maximum duty command value in the phases is set to an upper limit value, for example. The upper limit value may be a predetermined value, or may be variable in accordance with the upper minimum gate voltage Vga_#. When the duty command value D* is modulated such that the maximum duty command value in the phases is set to the upper limit value, the lower arm elements 14 to 16 are each turned off. As a result, the lower arm elements 14 to 16 can be further protected against decrease in the gate voltage Vgb.

At S109, the basic electric current limit value calculator 57 sets the lower basic electric current limit value I*_gb calculated in accordance with the lower minimum gate voltage Vgb_# to the basic electric current limit value I*_v. The gradually-decrease processor 58 performs a fading process at a second electric current limitation rate R2 to calculate the electric current limit value I**_v.

S110 is a step to which the processing proceeds when the upper minimum gate voltage Vga_# is equal to or more than the upper determination threshold value THa and the lower minimum gate voltage Vgb_# is equal to or more than the lower determination threshold value THb, i.e., when the gate voltage does not decrease. At S110, the voltage determination section 67 determines whether the control wiring voltage Vig is less than the determination threshold value THc, and the power wiring voltage Vpig is less than a determination threshold value THd. The determination threshold values THb, THc, and THd may be equal or different. When it is at least determined that the control wiring voltage Vig is equal to or more than the determination threshold value THc, or the power wiring voltage Vpig is equal to or more than the determination threshold value THd (NO at S110), electric current is not limited. The power wiring voltage Vpig and the control wiring voltage Vig are input into a driver 30, and thus when any one of the voltages is equal to or more than the determination threshold value, the gate voltage is less likely to decrease to cause electric current limitation of voltage reference to be unnecessary (refer to FIG. 2). When it is determined that the control wiring voltage Vig is less than the determination threshold value THc and the power wiring voltage Vpig is less than the determination threshold value THd (YES at S110), the processing proceeds to S111.

At S111, the basic electric current limit value calculator 57 calculates an input-voltage-reference current limit value I*_in in accordance with the control wiring voltage Vig or the power wiring voltage Vpig, and sets the input-voltage-reference current limit value I*_in as the basic electric current limit value I*_v. The input-voltage-reference current limit value I*_in is calculated by map calculation or the like, for example. The gradually-decrease processor 58 performs a fading process at a third electric current limitation rate to calculate the electric current limit value I_v. The third electric current limitation rate R3 is set to a value allowing the electric current limit value I_v to drop to the basic electric current limit value I*_v in an order of a few hundreds ms, for example. That is, R1≥R2>>R3. R1 is equal to or more than R2, and R2 is more than R3.

In the present embodiment, when only one of the upper gate voltage Vga and the lower gate voltage Vgb is less than the corresponding determination threshold value, the neutral point voltage is shifted to reduce time of electric current supply to an arm with the gate voltage less than the corresponding determination threshold value. Accordingly, heat generation can be suppressed by reducing time of electric current supply to an arm with the gate voltage in a low voltage state, without distorting an electric current waveform of motor electric current I.

In the present embodiment, each of the electric current limitation rates is set in accordance with the gate voltages Vga and Vgb, the power wiring voltage Vpig, and the control wiring voltage Vig. That is, when the state the gate voltages Vga and Vgb each becomes the low voltage state, electric current is immediately limited. In particular, when both the upper gate voltage Vga and the lower gate voltage Vgb are each in the low voltage state, electric current is limited more immediately than when one of the upper gate voltage Vga and the lower gate voltage Vgb is in the low voltage state.

When the power wiring voltage Vpig for supplying electric power to the driver 30 and the control wiring voltage Vig are each in the low voltage state, the gate voltages Vga and Vgb may decrease. Thus, when the power wiring voltage Vpig and the control wiring voltage Vig are each in the low voltage state, electric current is limited even when the gate voltages Vga and Vgb are each not in the low voltage state. In this case, when electric current is limited slowly compared to the case where the gate voltages Vga and Vgb are each in the low voltage state, influence on a driver due to reduction in assist can be reduced as small as possible.

In particular, a power converter 1 of the present embodiment is used in an electric power steering system 8 that is an on-vehicle device, and a battery 5 is shared with a device 4 other than the electric power steering system 8. Thus, even when electric power extracted by a load other than the motor 80 increases, the power wiring voltage Vpig and the control wiring voltage Vig may decrease, resulting in decrease in gate voltage. Then, in the present embodiment, when the power wiring voltage Vpig and the control wiring voltage Vig decrease even if the gate voltages Vga and Vgb do not decrease, electric current is slowly limited. This enables decrease in the gate voltages Vga and Vgb to be suppressed by reducing electric power extracted from battery 5 while suppressing influence on a driver due to reduction in assist.

In the present embodiment, the controller 42 limits electric current that flows into the motor 80, in accordance with the gate voltages Vga and Vgb, and input voltage Vin that is the power wiring voltage Vpig being voltage of an upper bus 17 or the control wiring voltage Vig being voltage of the control wiring 75. In the present embodiment, the controller 42 includes the voltage determination section 67. When the gate voltages Vga and Vgb are less than the determination threshold values THa and THb, respectively, the voltage determination section 67 determines it as a low gate voltage state. When the control wiring voltage Vig is less than the determination threshold value THc, or the power wiring voltage Vpig is less than the determination threshold value THd, the voltage determination section 67 determines it as a low input voltage state. In the present embodiment, the determination threshold values THa and THb each correspond to the "gate determination threshold value". The determination threshold values THc and THd each correspond to the "input determination threshold value".

When a SW element is in the low input voltage state but is not in the low gate voltage state, the gradually-decrease processor 58 reduces the electric current limitation rate more than when the SW element is in the low gate voltage state. Specifically, the electric current limitation rate R3 when a SW element is in the low input voltage state is less than each of the electric current limitation rates R1 and R2 when the SW element is in the low gate voltage state. In the present embodiment, when a SW element is in the low gate voltage state, electric current is immediately limited to protect SW elements 11 to 16. In contrast, when the SW element is in the low input voltage state but is not in the low gate voltage state, electric current is slowly limited to reduce a load on the battery 5 while influence on a driver is suppressed. This enables electric current to be limited at an appropriate speed in accordance with a state of decrease in voltage.

The gradually-decrease processor 58 sets the electric current limitation rate R2 when the upper arm elements 11 to 13 or the lower arm elements 14 to 16 are each have gate voltage in the low gate voltage state to equal to or less than the electric current limitation rate R1 when the upper arm elements 11 to 13 and the lower arm element 14 to 16 each have gate voltage in the low gate voltage state. This enables electric current to be limited at an appropriate speed in accordance with gate voltage of each of the SW elements 11 to 16.

When the upper arm elements 11 to 13 each have gate voltage in the low gate voltage state and the lower arm elements 14 to 16 each do not have gate voltage in the low gate voltage state, the duty calculator 63 shifts the duty command value D* downward to reduce the neutral point voltage. When the lower arm elements 14 to 16 each have gate voltage in the low gate voltage state and the upper arm elements 11 to 13 each do not have gate voltage in the low gate voltage state, the duty calculator 63 shifts the duty command value D* upward to increase the neutral point voltage. Here, the sentence, "shifts downward" means that a predetermined value is subtracted from the duty command value D* of each phase, and the sentence, "shifts upward" means that a predetermined value is added to the duty command value D* of each phase. The value to be added to or subtracted from the duty command value D* may be variable in accordance with a value of the duty command value D* before addition or subtraction or the like. Accordingly, time of electric current supply to an arm with lower gate voltages Vga and Vgb is reduced, so that heat generation of the arm in which the gate voltages Vga and Vgb decrease can be suppressed. Effects similar to those of the embodiment described above are achieved.

Fourth Embodiment

Figure 13:
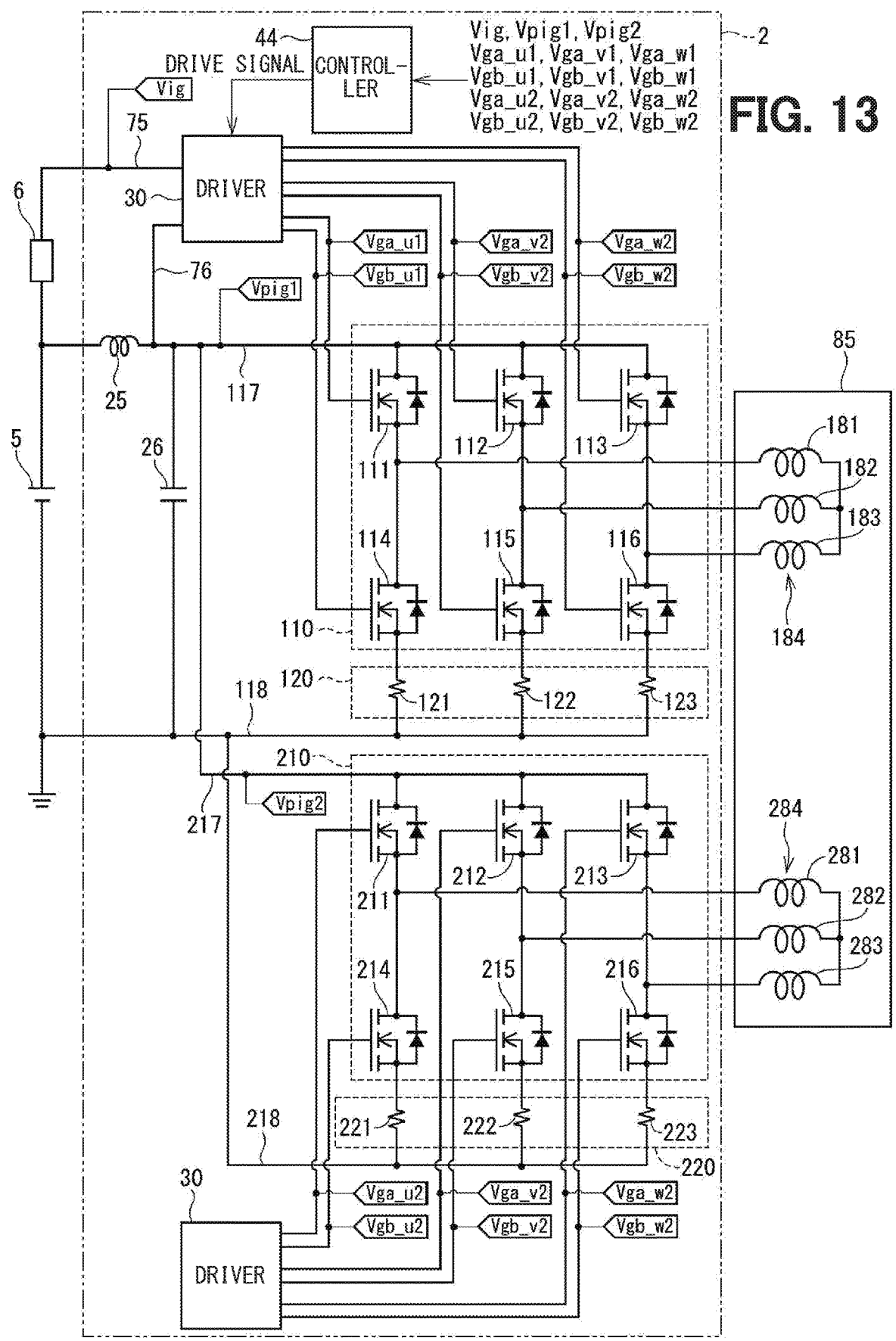
FIG. 13 is a circuit diagram illustrating a power converter according to a fourth embodiment.
Figure 14:
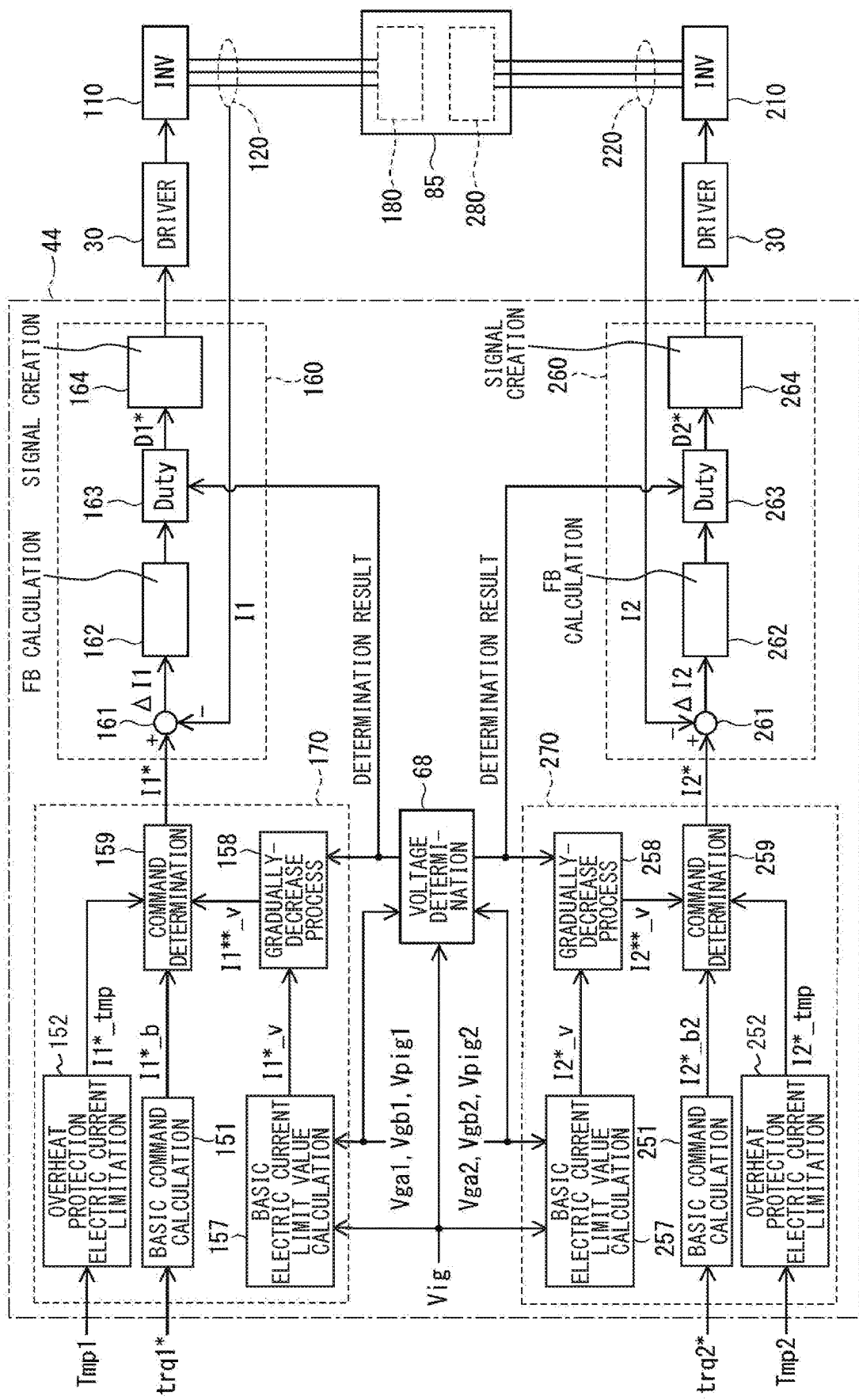
FIG. 14 is a block diagram illustrating a controller according to the fourth embodiment.
Figure 15:
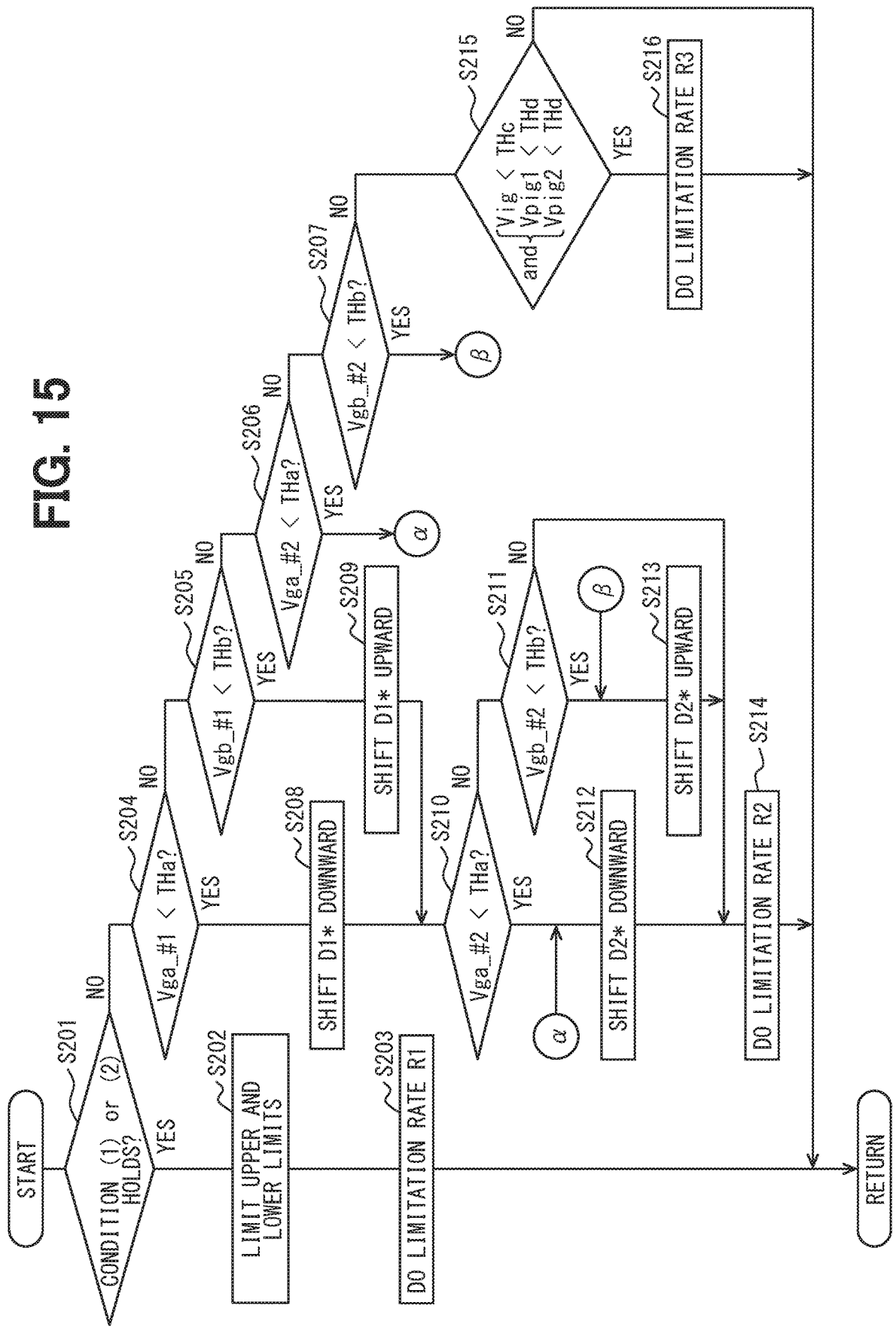
FIG. 15 is a flowchart illustrating a process of suppressing electric current supply according to the fourth embodiment.

A fourth embodiment is illustrated in FIGS. 13 to 15. As illustrated in FIG. 13, a motor 85 of the present embodiment includes two coil sets 184, 284. The first coil set 184 includes a U1 coil 181, a V1 coil 182, and a W1 coil 183. The second coil set 284 includes a U2 coil, 281, a V2 coil 282, and a W2 coil 283.

A power converter 2 includes inverters 110, 210, a driver 30, a controller 44, and the like. FIGS. 13 and 14 each illustrate the driver 30 divided into two for convenience of illustration. In addition, FIG. 13 does not illustrate a device 4. The first inverter 110 is provided corresponding to the first coil set 184 to convert electric power supplied to the first coil set 184. The second inverter 210 is provided corresponding to the second coil set 284 to convert electric power supplied to the second coil set 284. The first coil set 184 and a component provided corresponding to the first coil set are indicated as a first system, and the second coil set 284 and a component provided corresponding to the second coil set are indicated as a second system. Then, a component related to the first system is designated by a number in 100s, and a component related to the second system is designated by a number in 200s. In addition, a component similar to that of the first embodiment is designated by a number with the same last two digits as those of the first embodiment, and duplicated description is appropriately eliminated. As appropriate, an index of "1" is added to a component or a value related to the first system, and an index of "2" is added to a component or a value related to the second system. When the systems are not distinguished, a component or a value is indicated without the index.

The first inverter 110 includes SW elements 111 to 116. The SW elements 111 to 113 are disposed on a high potential side, and the SW elements 114 to 116 are disposed on a low potential side. The second inverter 210 includes SW elements 211 to 216. The SW elements 211 to 213 are disposed on a high potential side, and the SW elements 214 to 216 are disposed on a low potential side. The SW elements 111 to 113, and 211 to 213, disposed on the high potential side are each referred to as the "upper arm element". The SW elements 114 to 116, and 214 to 216, disposed on the low potential side are each referred to as the "lower arm element".

The upper arm elements 111 to 113 of the first inverter 110 each have a drain connected to a cathode of a battery 5 via an upper bus 117. The upper arm elements 211 to 213 of the second inverter 210 each have a drain connected to the cathode of the battery 5 via an upper bus 217. The lower arm elements 114 to 116 of the first inverter 110 each have a source connected to a ground via a lower bus 118. The lower arm elements 214 to 216 of the second inverter 210 are each connected to the ground via a lower bus 218. In the present embodiment, the upper buses 117, 217 each correspond to the "power wiring".

The first current detector 120 includes current detection elements 121 to 123 that detect phase electric currents Iu1, Iv1, and Iw1 of the first coil set 184, respectively. The second current detector 220 includes current detection elements 221 to 223 that detect phase electric currents Iu2, Iv2, and Iw2 of the second coil set 284, respectively. Detection values of the current detectors 120, 220 are output to the controller 41. The phase electric currents Iu1, Iv1, and Iw1 of the first coil set 184 are referred to as a motor electric current I1 as a whole, and the phase electric currents Iu2, Iv2, and Iw2 of the second coil set 284 are referred to as a motor electric current I2 as a whole.

The driver 30 applies gate voltage to a gate of each of the SW elements 111 to 116, and 211 to 216 in response to a command signal from the controller 44. Specifically, gate voltage Vga_u1 is applied to the SW element 111, gate voltage Vga_v1 is applied to the SW element 112, gate voltage Vga_w1 is applied to the SW element 113, gate voltage Vgb_u1 is applied to the SW element 114, gate voltage Vgb_v1 is applied to the SW element 115, and gate voltage Vgb_w1 is applied to the SW element 116. Then, gate voltage Vga_u2 is applied to the SW element 211, gate voltage Vga_v2 is applied to the SW element 212, gate voltage Vga_w2 is applied to the SW element 213, gate voltage Vgb_u2 is applied to the SW element 214, gate voltage Vgb_v2 is applied to the SW element 215, and gate voltage Vgb_w2 is applied to the SW element 216.

The gate voltages Vga_u1, Vga_v1, and Vga_w1 are referred to as upper gate voltage Vga1 as a whole, and the gate voltages Vgb_u1, Vgb_v1, and Vgb_w1 are referred to as lower gate voltage Vgb1 as a whole. The gate voltages Vga_u2, Vga_v2, and Vga_w2 are referred to as upper gate voltage Vga2 as a whole, and the gate voltages Vgb_u2, Vgb_v2, and Vgb_w2 are referred to as lower gate voltage Vgb2 as a whole. A minimum value of the upper gate voltages Vga_u1, Vga_v1, and Vga_w1 is referred to as upper minimum gate voltage Vga_#1. A minimum value of the upper gate voltages Vga_u2, Vga_v2, Vga_w2 is referred to as upper minimum gate voltage Vga_#2. A minimum value of the lower gate voltage Vgb_u1, Vgb_v1, and Vgb_w1 is referred to as lower minimum gate voltage Vgb_#1, and a minimum value of the lower gate voltage Vgb_u2, Vgb_v2, and Vgb_w2 is referred to as lower minimum gate voltage Vgb_#.

The lower gate voltages Vgb1, Vgb2 applied to the corresponding lower arm elements 114 to 116, and 214 to 216 are substantially equal to power wiring voltage Vpig1 being voltage of the upper bus 117, power wiring voltage Vpig2 being voltage of the upper bus 217, and control wiring voltage Vig. The upper gate voltages Vga1, Vga2 applied to the corresponding upper arm elements 111 to 113, and 211 to 213, are increased more than lower gate voltage by a charge pump circuit or the like. The control wiring voltage Vig, and the power wiring voltages Vpig1, Vpig2 are appropriately referred to as input voltage Vin as a whole.

As illustrated in FIG. 14, the controller 44 includes current command calculators 170, 270, drive controllers 160, 260, and a voltage determination section 68. While the current command calculators 170, 270 are here provided for each system, one current command calculator may be provided for multiple systems. The first current command calculator 170 includes a basic command calculator 151, an overheat protection electric current limiter 152, a basic electric current limit value calculator 157, a gradually-decrease processor 158, and a command determiner 159. The second current command calculator 270 includes a basic command calculator 251, an overheat protection electric current limiter 252, a basic electric current limit value calculator 257, a gradually-decrease processor 258, and a command determiner 259.

The basic command calculator 151 calculates a basic current command value I1*_b in accordance with a torque command value trq1*. The overheat protection electric current limiter 152 calculates a temperature-reference current limit value I1*_tmp suitable for temperature of the SW elements 111 to 116. The basic command calculator 251 calculates a basic current command value I2*_b in accordance with a torque command value trq2*. The overheat protection electric current limiter 252 calculates a temperature-reference current limit value I2*_tmp suitable for temperature of the SW elements 211 to 216.

The basic electric current limit value calculator 157 calculates a basic electric current limit value I1*_v in accordance with the gate voltages Vga1 and Vgb1, the power wiring voltage Vpig1, or the control wiring voltage Vig. The basic electric current limit value calculator 257 calculates a basic electric current limit value I2*_v in accordance with the gate voltages Vga2 and Vgb2, the power wiring voltage Vpig2, or the control wiring voltage Vig.

The gradually-decrease processor 158 performs a fading process on the basic electric current limit value I1*_v in accordance with a voltage determination result in the voltage determination section 68 to calculate an electric current limit value I1**_v. The gradually-decrease processor 258 performs a fading process on the basic electric current limit value I2*_v in accordance with a voltage determination result in the voltage determination section 68 to calculate an electric current limit value I2**_v.

The command determiner 159 calculates an electric current command value I1* with minimum selection in accordance with the basic current command value I1*_b, the temperature reference current limit value I1*_tmp, and the electric current limit value I1**_v. The command determiner 259 calculates a current command value I2* with minimum selection in accordance with the basic current command value I2*_b, the temperature reference current limit value I2*_tmp, and the electric current limit value I2**_v.

The drive controller 160 includes a subtractor 161, an electric current FB calculator 162, a duty calculator 163, and a signal generator 164. The drive controller 160 creates a command signal for controlling on-off operation of the SW elements 111 to 116 using electric current feedback control, and outputs the command signal to the driver 30. The drive controller 260 includes a subtractor 261, an electric current FB calculator 262, a duty calculator 263, and a signal generator 264. The drive controller 260 creates a command signal for controlling on-off operation of the SW elements 211 to 216 using electric current feedback control, and outputs the command signal to the driver 30.

The voltage determination section 68 determines the upper gate voltages Vga1 and Vga2, the lower gate voltages Vgb1 and Vgb2, the power wiring voltages Vpig1 and Vpig2, and the control wiring voltage Vig by comparison with respective determination threshold values, and outputs determination results to the gradually-decrease processors 158, 258, and the duty calculators 163, 263. The duty calculators 163, 263 each change a duty command value D* in accordance with voltage determination results in the voltage determination section 68.

A process of suppressing electric current supply of the present embodiment will be described with reference to the flowchart of FIG. 15. This process is performed by the controller 44 in a predetermined cycle. Details of a fading process of the electric current limit values and a duty changing process are similar to those of the embodiments described above. The same applies to a fifth embodiment. At S201, the voltage determination section 68 determines whether both of Criterion Formulas (1-1) and (1-2) hold, or both of Criterion Formulas (2-1) and (2-2) hold. The fact that both of Criterion Formulas (1-1) and (1-2) hold is indicated as follows: "Condition (1) holds", and the fact that at least one of Criterion Formulas (1-1) and (1-2) does not hold is indicated as follows: "Condition (1) does not hold". Likewise, the fact that both of Criterion Formulas (2-1) and (2-2) hold is indicated as follows: "condition (2) holds", and the fact that at least one of Criterion Formulas (2-1) and (2-2) does not hold is indicated as follows: "condition (2) does not hold". While here the first system and the second system each use the same determination threshold values of the respective gate voltages, the determination threshold values may be different for each system.

$$Vga\_\#1 < THa \qquad (1\text{-}1)$$

$$Vgb\_\#1 < THb \qquad (1\text{-}2)$$

$$Vga\_\#2 < THa \qquad (2\text{-}1)$$

$$Vgb\_\#2 < THb \qquad (2\text{-}2)$$

When it is determined that Condition (1) and Condition (2) do not hold (NO at S201), processing proceeds to S204. When it is determined that at least one of Condition (1) and Condition (2) holds (YES at S201), the processing proceeds to S202.

At S202, the duty calculator 163 limits upper and lower limits of a duty command value D1* in accordance with the upper minimum gate voltage Vga_#1 and the lower minimum gate voltage Vgb_#1. The duty calculator 263 also limits upper and lower limits of a duty command value D2* in accordance with the upper minimum gate voltage Vga_#2 and the lower minimum gate voltage Vgb_#2. Details of limiting the upper and lower limits of the respective duty command values D1* and D2* are as in the description of the second embodiment.

At S203, the basic electric current limit value calculator 157 calculates the basic electric current limit value I1*_v in accordance with the upper minimum gate voltage Vga_#1 and the lower minimum gate voltage Vgb_#1. The gradually-decrease processor 158 performs a fading process at a first electric current limitation rate R1 to calculate the electric current limit value I1**_v. The basic electric current limit value calculator 257 calculates the basic electric current limit value I2*_v in accordance with the upper minimum gate voltage Vga_#2 and the lower minimum gate voltage Vgb_#2. The gradually-decrease processor 258 performs a fading process at a second electric current limitation rate R2 to calculate the electric current limit value I2**_v.

At S204, the voltage determination section 68 determines whether the upper minimum gate voltage Vga_#1 of the first system is less than an upper determination threshold value THa, i.e., whether Criterion Formula (1-1) holds. When it is determined that the upper minimum gate voltage Vga_#1 is less than the upper determination threshold value THa (YES at S204), the processing proceeds to S208. When it is determined that the upper minimum gate voltage Vga_#1 is equal to or more than the upper determination threshold value THa (NO at S204), the processing proceeds to S205.

At S205, the voltage determination section 68 determines whether the lower minimum gate voltage Vgb_#1 of the first system is less than a lower determination threshold value THb, i.e., whether Criterion Formula (1-2) holds. When it is determined that the lower minimum gate voltage Vgb_#1 is less than the lower determination threshold value THb (YES at S205), the processing proceeds to S209. When it is determined that the lower minimum gate voltage Vgb_#1 is equal to or more than the lower determination threshold value THb (NO at S205), the processing proceeds to S206.

At S206, the voltage determination section 68 determines whether the upper minimum gate voltage Vga_#2 of the second system is less than the upper determination threshold value THa, i.e., whether Criterion Formula (2-1) holds. When it is determined that the upper minimum gate voltage Vga_#2 is less than the upper determination threshold value THa (YES at S206), the processing proceeds to S212. When it is determined that the upper minimum gate voltage Vga_#2 is equal to or more than the upper determination threshold value THa (NO at S206), the processing proceeds to S207.

At S207, the voltage determination section 68 determines whether the lower minimum gate voltage Vgb_#2 of the second system is less than the lower determination threshold value THb, i.e., whether Criterion Formula (2-2) holds. When it is determined that the lower minimum gate voltage Vgb_#2 is less than the lower determination threshold value THb (YES at S207), the processing proceeds to S213. When it is determined that the lower minimum gate voltage Vgb_#2 is equal to or more than the lower determination threshold value THb (NO at S207), the processing proceeds to S215.

S208 is a step to which the processing proceeds when determination is affirmative at S204, i.e., when the upper minimum gate voltage Vga_#1 is less than the upper determination threshold value THa and the lower minimum gate voltage Vgb_#1 is equal to or more than the lower determination threshold value THb, in the first system. At S208, the duty calculator 163 shifts the duty command value D1* of the first system downward to reduce neutral point voltage to be applied to the first coil set 184.

S209 is a step to which the processing proceeds when determination is affirmative at S205, i.e., when the lower minimum gate voltage Vgb_#1 is less than the lower determination threshold value THb and the upper minimum gate voltage Vga_#1 is equal to or more than the upper determination threshold value THa, in the first system. At S209, the duty calculator 163 shifts the duty command value D1* of the first system upward to increase neutral point voltage to be applied to the first coil set 184.

Processing at S210 subsequent to S208 or S209 is similar to that at S206. When determination is affirmative at S210, the processing proceeds to S212, and when determination is negative, the processing proceeds to S211. Processing at S211 is similar to that at S207. When determination is affirmative at S211, the processing proceeds to S213, and when the determination is negative, the processing proceeds to S214.

S212 is a step to which the processing proceeds when determination is affirmative at S206 or S210, i.e., when the upper minimum gate voltage Vga_#2 is less than the upper determination threshold value THa and the lower minimum gate voltage Vgb_#2 is equal to or more than the lower determination threshold value THb, in the second system. At S212, the duty calculator 263 shifts the duty command value D2* of the second system downward to reduce neutral point voltage to be applied to the second coil set 284.

S213 is a step to which the processing proceeds when determination is affirmative at S207 or S211, i.e., when the lower minimum gate voltage Vgb_#2 is less than the lower determination threshold value THb and the upper minimum gate voltage Vga_#2 is equal to or more than the upper determination threshold value THa, in the second system. At S213, the duty calculator 263 shifts the duty command value D2* of the second system upward to increase neutral point voltage to be applied to the second coil set 284. Details of shifting the duty command values D1* and D2* in the vertical direction are as in the description of the third embodiment.

At S214, the basic electric current limit value calculator 157 calculates the basic electric current limit value I1*_v in accordance with the upper minimum gate voltage Vga_#1 or the lower minimum gate voltage Vgb_#1, being in a low voltage state. The gradually-decrease processor 158 performs a fading process at the second electric current limitation rate R2 to calculate the electric current limit value I2**_v. The basic electric current limit value calculator 257 calculates the basic electric current limit value I2*_v in accordance with the upper minimum gate voltage Vga_#2 or the lower minimum gate voltage Vgb_#2, being in a low voltage state. The gradually-decrease processor 258 performs a fading process at a second electric current limitation rate R2 to calculate the electric current limit value I2**_v.

S215 is a step to which the processing proceeds when each of Criterion Formulas (1-1), (1-2), (2-1), and (2-2) does not hold, i.e., when the gate voltages Vga1, Vgb1, Vga2, and Vgb2 are each not in a low voltage state. At S215, the voltage determination section 68 determines whether the control wiring voltage Vig is less than a determination threshold value THc, and the power wiring voltages Vpig1 and Vpig2 are both less than a determination threshold value THd. When it is determined that at least one of the control wiring voltage Vig, and the power wiring voltages Vpig1 and Vpig2 is equal to or more than the corresponding one of the determination threshold values (NO at S215), electric current is not limited. When it is determined that the control wiring voltage Vig is less than the determination threshold value THc and the power wiring voltages Vpig1 and Vpig2 are both less than the determination threshold value THd (YES at S215), the processing proceeds to S216.

At S216, the basic electric current limit value calculators 157, 257 calculate the basic electric current limit values I1*_v and I2*_v, respectively, in accordance with the control wiring voltage Vig or the power wiring voltages Vpig1 and Vpig2. The gradually-decrease processors 158, 258 each perform a fading process at a third electric current limitation rate R3 to calculate the corresponding one of the electric current limit values I1_v and I2_v.

In the present embodiment, when the control wiring voltage Vig and the power wiring voltages Vpig1 and Vpig2 are both less than the corresponding one of the determination threshold values, it is assumed that the input voltage Vin is in a low voltage state, and then electric current is limited even when each of the gate voltages is not in a low voltage state. In addition, the power wiring voltage Vpig1 of the first system is substantially equal to the power wiring voltage Vpig2 of the second system. Thus, when any one of the power wiring voltages Vpig1 and Vpig2 is less than the determination threshold value THd, it is assumed that there is not decrease in voltage but an anomaly in voltage detection. Then, in the present embodiment, when any one of the power wiring voltages Vpig1 and Vpi2 is more than the determination threshold value THd, electric current is not limited. As a result, unnecessary electric current limitation can be avoided.

In the present embodiment, the two inverters 110, 210 are provided. When the power wiring voltages Vpig1 and Vpig2 of one of the inverters are each less than the determination threshold value THd, and the power wiring voltages Vpig1 and Vpig2 of the other of the inverters are each equal to or more than the determination threshold value THd, the controller 44 does not cause electric current to be limited in accordance with the input voltage Vin. As a result, unnecessary electric current limitation can be avoided. Effects similar to those of the embodiment described above are achieved.

Fifth Embodiment

Figure 16:
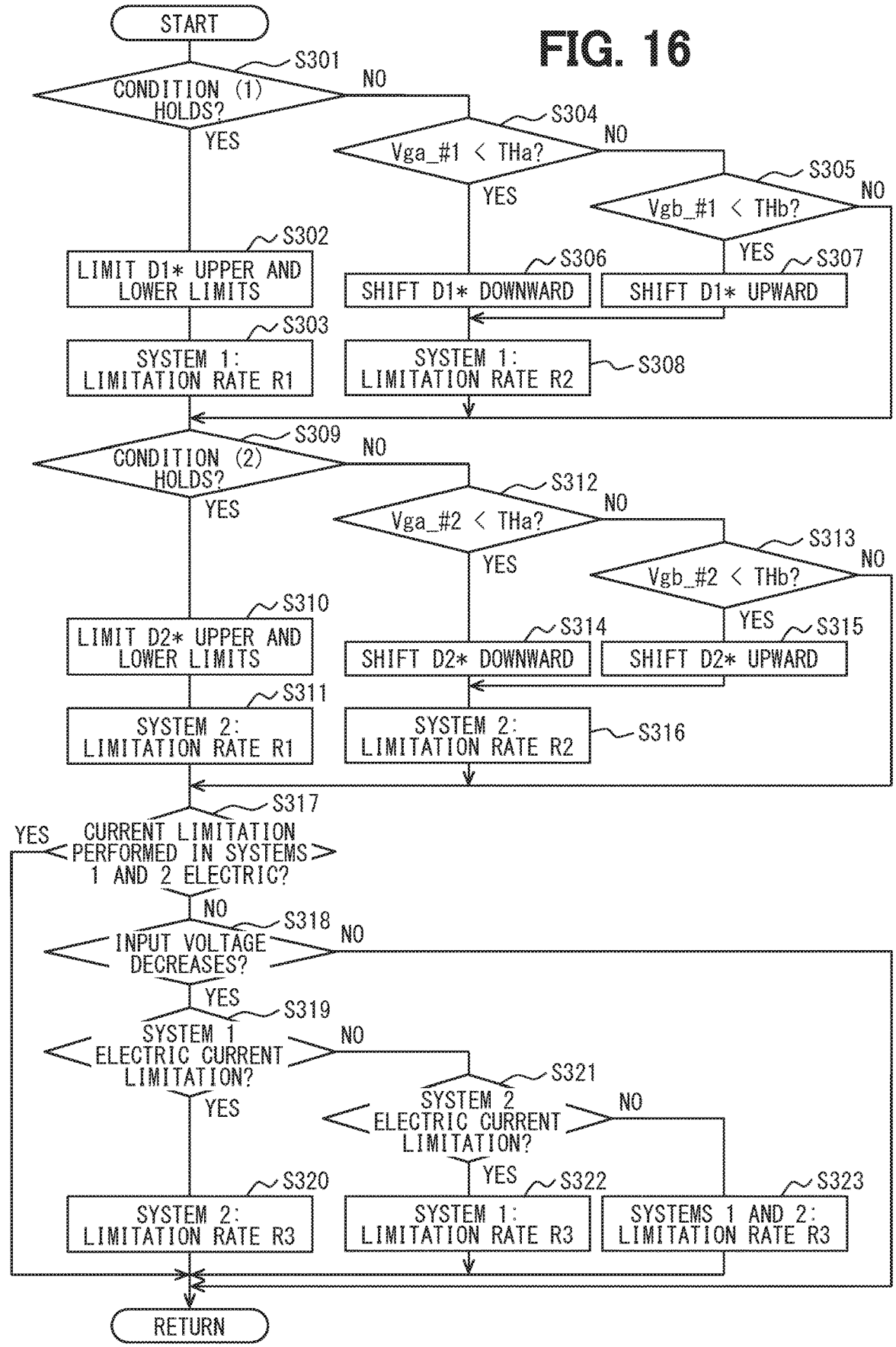
FIG. 16 is a flowchart illustrating a process of suppressing electric current supply according to a fifth embodiment.

FIG. 16 illustrates a fifth embodiment. The present embodiment is different from the fourth embodiment in a process of suppressing electric current supply, so that this point will be mainly described. The process of suppressing electric current supply of the present embodiment will be described with reference to the flowchart of FIG. 16. At S301, a voltage determination section 68 determines whether Condition (1) holds, i.e., whether upper minimum gate voltage Vga_#1 and lower minimum gate voltage Vgb_#1 of a first system are each less than a determination threshold value. When it is determined that Condition (1) does not hold (NO at S301), i.e., when it is at least determined that the upper minimum gate voltage Vga_#1 is equal to or more than an upper determination threshold value THa, or the lower minimum gate voltage Vgb_#1 is equal to or more than a lower determination threshold value THb, processing proceeds to S304. When it is determined that Condition (1) holds (YES at S301), i.e., when the gate voltages Vga_#1 and Vgb_#1 are less than the corresponding determination threshold values, the processing proceeds to S302.

At S302, a duty calculator 163 limits upper and lower limits of a duty command value D1*. At S303, a basic electric current limit value calculator 157 calculates a basic electric current limit value I1*_v in accordance with the upper minimum gate voltage Vga_#1 and the lower minimum gate voltage Vgb_#1. The gradually-decrease processor 158 performs a fading process at a first electric current limitation rate R1 to calculate the electric current limit value I1**_v.

At S304 to which the processing proceeds when it is determined that Condition (1) does not hold (NO at S301), the voltage determination section 68 determines whether the upper minimum gate voltage Vga_#1 is less than the upper determination threshold value THa. When it is determined that the upper minimum gate voltage Vga_#1 is less than the upper determination threshold value THa (YES at S304), the processing proceeds to S306. When it is determined that the upper minimum gate voltage Vga_#1 is equal to or more than the upper determination threshold value THa (NO at S304), the processing proceeds to S305.

At S305, the voltage determination section 68 determines whether the lower minimum gate voltage Vgb_#1 is less than the lower determination threshold value THb. When it is determined that the lower minimum gate voltage Vgb_#1 is less than the lower determination threshold value THb (YES at S305), the processing proceeds to S307. When it is determined that the lower minimum gate voltage Vgb_#1 is equal to or more than the lower determination threshold value THb (NO at S305), there is no decrease in gate voltage in the first system. Accordingly, a voltage-reference electric current limiting process and a duty changing process are not performed, and the processing proceeds to S309.

S306 and S307 are similar to S208 and S209 in FIG. 14, respectively. At S308, the basic electric current limit value calculator 157 calculates the basic electric current limit value I1*_v in accordance with the upper minimum gate voltage Vga_#1 or the lower minimum gate voltages Vgb_#1, being in a low voltage state. The gradually-decrease processor 158 performs a fading process at a second electric current limitation rate R2 to calculate the electric current limit value I1**_v.

At S309, the voltage determination section 68 determines whether Condition (2) holds, i.e., whether upper minimum gate voltage Vga_#2 and lower minimum gate voltage Vgb_#2 of a second system are each less than a determination threshold value. When it is determined that Condition (2) does not hold (NO at S309), i.e., when it is at least determined that the upper minimum gate voltage Vga_#2 is equal to or more than an upper determination threshold value THa, or the lower minimum gate voltage Vgb_#2 is equal to or more than a lower determination threshold value THb, processing proceeds to S312. When it is determined that Condition (2) holds (YES at S309), i.e., when it is determined that both the gate voltages Vga_#2 and Vgb_#2 are less than the corresponding determination threshold values, the processing proceeds to S310.

At S310, a duty calculator 263 limits upper and lower limits of a duty command value D2*. At S311, the basic electric current limit value calculator 257 calculates a basic electric current limit value I2*_v in accordance with the upper minimum gate voltage Vga_#2 and the lower minimum gate voltage Vgb_#2. A gradually-decrease processor 258 performs a fading process at the first electric current limitation rate R1 to calculate an electric current limit value I2**_v.

At S312 to which the processing proceeds when it is determined that Condition (2) does not hold (NO at S309), the voltage determination section 68 determines whether the upper minimum gate voltage Vga_#2 is less than the upper determination threshold value THa. When it is determined that the upper minimum gate voltage Vga_#2 is less than the upper determination threshold value THa (YES at S312), the processing proceeds to S314. When it is determined that the upper minimum gate voltage Vga_#2 is equal to or more than the upper determination threshold value THa (NO at S312), the processing proceeds to S313.

At S313, the voltage determination section 68 determines whether the lower minimum gate voltage Vgb_#2 is less than the lower determination threshold value THb. When it is determined that the lower minimum gate voltage Vgb_#2 is less than the lower determination threshold value THb (YES at S313), the processing proceeds to S315. When it is determined that the lower minimum gate voltage Vgb_#2 is equal to or more than the lower determination threshold value THb (NO at S313), there is no decrease in gate voltage in the second system. Accordingly, the voltage-reference electric current limiting process and the duty changing process are not performed, and the processing proceeds to S317.

S314 and S315 are similar to S212 and S213 in FIG. 14, respectively. At S316, a basic electric current limit value calculator 257 calculates the basic electric current limit value I2*_v in accordance with the upper minimum gate voltage Vga_#2 or the lower minimum gate voltages Vgb_#2, being in a low voltage state. The gradually-decrease processor 258 performs a fading process at a second electric current limitation rate R2 to calculate the electric current limit value I2**_v.

At S317, a controller 44 determines whether electric current is limited in the first system and the second system. When electric current is limited in the first system and the second system (YES at S317), processing subsequent to S318 is not performed. When electric current is not limited in at least one of the first system and the second system (NO at S317), the processing proceeds to S318.

At S318, the voltage determination section 68 determines whether input voltage Vin decreases. Details of determination contents are similar to those at S215 in FIG. 14. When control wiring voltage Vig is less than a determination threshold value THc, and power wiring voltages Vpig1 and Vpig2 are both less than a determination threshold value THd, the voltage determination section determines that the input voltage Vin decreases. When it is determined that the input voltage Vin does not decrease (NO at S318), processing subsequent to S319 is not performed, and electric current is not limited.

At S319, the controller 44 determines whether electric current is limited in the first system. When it is determined that electric current is limited in the first system (YES at S319), the processing proceeds to S320. When it is determined that electric current is not limited in the first system (NO at S319), the processing proceeds to S321.

S320 is a step to which the processing proceeds when electric current is limited in the first system and is not limited in the second system. At S320, the basic electric current limit value calculators 257 calculates the basic electric current limit value I2*_v in accordance with the control wiring voltage Vig, and the power wiring voltages Vpig1 and Vpig2. The gradually-decrease processor 258 performs a fading process at a third electric current limitation rate R3 to calculate the electric current limit value I2**_v.

At S321, the controller 44 determines whether electric current is limited in the second system. When it is determined that electric current is limited in the second system (YES at S321), the processing proceeds to S322. When it is determined that electric current is not limited in the second system (NO at S321), the processing proceeds to S323.

S322 is a step to which the processing proceeds when electric current is not limited in the first system and is limited in the second system. At S322, the basic electric current limit value calculators 157 calculates the basic electric current limit value I1*_v in accordance with the control wiring voltage Vig, or the power wiring voltages Vpig1 and Vpig2. The gradually-decrease processor 158 performs a fading process at the third electric current limitation rate R3 to calculate the electric current limit value I1**_v.

S323 is a step to which the processing proceeds when electric current is not limited in the first system and the second system. The basic electric current limit value calculators 157, 257 calculate the basic electric current limit values I1*_v and I2*_v, respectively, in accordance with the control wiring voltage Vig or the power wiring voltages Vpig1 and Vpig2. The gradually-decrease processors 158, 258 each perform a fading process at a third electric current limitation rate R3 to calculate the corresponding one of the electric current limit values I1_v and I2_v. In the present embodiment, the electric current limitation rate at the time of electric current limitation is set for each system in accordance with the gate voltages Vga1, Vgb1, Vga2, and Vgb2, and the input voltage Vin. As a result, electric current can be appropriately limited for each system. The configuration described above also enables achieving effects similar to those of the embodiments described above.

Other Embodiments

In the embodiments described above, when the gate voltage or the input voltage decreases, the electric current limiting process and the duty changing process are performed. In other embodiments, a part of or all of the duty changing process may be eliminated. For example, a process of limiting upper and lower limits of duty when the upper arm element and the lower arm element each have low gate voltage may be eliminated.

In the embodiments described above, one or two coil sets are provided in a rotary electric machine. In the other embodiments, three or more coil sets may be provided, and inverters may be provided corresponding to the respective coil sets. In the embodiments described above, a load is the rotary electric machine. In the other embodiments, a load may be other than the rotary electric machine. In the embodiments described above, the power converter is used in an electric power steering system. In the other embodiments, the power converter may be used in an on-vehicle device other than the electric power steering system, or in a device other than that mounted in a vehicle. As described above, the present disclosure is not limited to the embodiments described above, and can be practiced in various aspects without departing from the essence of the present disclosure.

The present disclosure has been made in accordance with the embodiments. However, the present disclosure is not limited to the embodiments and configuration. The present disclosure also includes various modifications and modifications within the equivalent scope. Furthermore, various combination and formation, and other combination and formation including one, more than one or less than one element may be made in the present disclosure.

What is claimed is:

1. A power converter comprising:
an inverter that includes an upper arm element connected to a high potential side and a lower arm element connected to a low potential side, and converts electric power supplied from a direct current (DC) power source via a power wiring so as to supply the electric power to a load;
a driver that receives electric power supplied from the DC power source via a control wiring, and applies gate voltage to the upper arm element and the lower arm element; and
a controller that includes a drive controller controlling operation of the upper arm element and the lower arm element in accordance with a current command value, wherein:
the DC power source supplies the electric power to a device other than the inverter;
the controller limits electric current flowing into the load in accordance with the gate voltage, or the gate voltage and input voltage of voltage of the control wiring or voltage of the power wiring; and
the controller includes,
a basic electric current limit value calculator that calculates a basic electric current limit value in accordance with the gate voltage or the input voltage, and
a gradually-decrease processor that calculates an electric current limit value by fading the basic electric current limit value, wherein;
the controller includes a voltage determination section configured to determine a low gate voltage state in response to that the gate voltage is less than a gate determination threshold value, and determine a low input voltage state in response to that the input voltage is less than an input determination threshold value, and
the gradually decrease processor reduces an electric current limitation rate to be less than an electric current limitation rate in a case of the low gate voltage state, in a case of the low input voltage state without being in the low gate voltage state.

2. The power converter according to claim 1, wherein:
the gradually-decrease processor causes the electric current limitation rate at a time when the upper arm element or the lower arm element is in the low gate voltage state to be equal to or less than the electric current limitation rate at a time when both of the upper arm element and the lower arm element are in the low gate voltage state.

3. The power converter according to claim 1, wherein:
the drive controller includes a duty calculator that calculates a duty command value related to on-time of each of the upper arm element and the lower arm element; and
the duty calculator changes the duty command value calculated from the current command value in response to at least one of the gate voltage of the upper arm element and the lower arm element being in a low gate voltage state in which the gate voltage is less than a gate determination threshold value.

4. The power converter according to claim 3, wherein:
in response to that the upper arm element is in the low gate voltage state, the duty calculator reduces an upper limit value of the duty command value to be less than an upper limit value of the duty command value at a time when the upper arm element is not in the low gate voltage state; and
in response to that the lower arm element is in the low gate voltage state, the duty calculator increases a lower limit value of the duty command value to be more than a lower limit value of the duty command value at a time when the lower arm element is not in the low gate voltage state.

5. The power converter according to claim 3, wherein:
the duty calculator shifts the duty command value downward to reduce neutral point voltage in response to that the upper arm element is in the low gate voltage state and the lower arm element is not in the low gate voltage state; and
the duty calculator shifts the duty command value upward to increase neutral point voltage in response to that the lower arm element is in the low gate voltage state and the upper arm element is not in the low gate voltage state.

6. The power converter according to claim 1, wherein:
the inverter includes two inverters, and
the controller performs no limitation of electric current in accordance with the input voltage in response to that voltage of the power wiring of one of the two inverters is less than a determination threshold value and voltage of the power wiring of another of the two inverters is equal to or more than the determination threshold value.

7. An electric power steering system comprising:
the power converter according to claim 1 in which the load is a rotary electric machine;
the rotary electric machine that outputs assist torque assisting steering of a steering member performed by a driver; and
a power transmission unit that transmits driving force of the rotary electric machine to an object to be driven.

8. A power converter comprising:
an inverter that includes an upper arm element connected to a high potential side and a lower arm element connected to a low potential side, and converts electric power supplied from a direct current (DC) power source via a power wiring so as to supply the electric power to a load;
a driver that receives electric power supplied from the DC power source via a control wiring, and applies gate voltage to the upper arm element and the lower arm element; and
a controller that includes a drive controller controlling operation of the upper arm element and the lower arm element in accordance with a current command value, wherein:
the DC power source supplies the electric power to a device other than the inverter;
the controller limits electric current flowing into the load in accordance with the gate voltage, or the gate voltage and input voltage of voltage of the control wiring or voltage of the power wiring;
the controller includes,
a basic electric current limit value calculator that calculates a basic electric current limit value in accordance with the gate voltage or the input voltage, and a gradually-decrease processor that calculates an electric current limit value by fading the basic electric current limit value;

the drive controller includes a duty calculator that calculates a duty command value related to on-time of each of the upper arm element and the lower arm element;

the duty calculator changes the duty command value calculated from the current command value in response to that at least one of the gate voltage of the upper arm element or the lower arm element is in a low gate voltage state in which the gate voltage is less than a gate determination threshold value;

the duty calculator shifts the duty command value downward to reduce neutral point voltage in response to that the upper arm element is in the low gate voltage state and the lower arm element is not in the low gate voltage state; and the duty calculator shifts the duty command value upward to increase neutral point voltage in response to that the lower arm element is in the low gate voltage state and the upper arm element is not in the low gate voltage state.

\* \* \* \* \*